(12) United States Patent
Lee et al.

(10) Patent No.: US 12,308,429 B2
(45) Date of Patent: May 20, 2025

(54) LITHIUM SECONDARY BATTERY

(71) Applicant: LG ENERGY SOLUTION, LTD., Seoul (KR)

(72) Inventors: Byoung Gu Lee, Daejeon (KR); Duk Hyun Ryu, Daejeon (KR); Kwan Hee Lee, Daejeon (KR); Myung An Lee, Daejeon (KR); Sue Jin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 253 days.

(21) Appl. No.: 18/045,096

(22) Filed: Oct. 7, 2022

(65) Prior Publication Data

US 2023/0117468 A1    Apr. 20, 2023

(30) Foreign Application Priority Data

Oct. 14, 2021  (KR) .......................... 10-2021-0136711
Sep. 23, 2022  (KR) .......................... 10-2022-0121172

(51) Int. Cl.
*H01M 4/525*       (2010.01)
*C01G 53/50*       (2025.01)
(Continued)

(52) U.S. Cl.
CPC ............ *H01M 4/525* (2013.01); *C01G 53/50* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

2005/0260489 A1* 11/2005 Kim .................... H01M 50/533
                                                                    429/163
2012/0070743 A1    3/2012 Kwon et al.
(Continued)

FOREIGN PATENT DOCUMENTS

CN    111742431 A    10/2020
CN    111902366 A    11/2020
(Continued)

OTHER PUBLICATIONS

European Patent Office Communication with extended search report issued in the corresponding European Patent Application No. 22881410.9 on Apr. 15, 2025.

*Primary Examiner* — Carlos Barcena
(74) *Attorney, Agent, or Firm* — Birch, Stewart, Kolasch & Birch, LLP

(57) ABSTRACT

A lithium secondary battery which includes an electrode assembly in which a positive electrode plate, a negative electrode plate, and a separator interposed between the positive electrode plate and the negative electrode plate are wound in one direction, a battery can in which the electrode assembly is accommodated, and a sealing body which seals an open end of the battery can. The positive electrode plate includes positive electrode active material comprising single particles, quasi-single particles, or a combination thereof, and the positive electrode active material has $D_{min}$ of 1.0 μm or more.

18 Claims, 14 Drawing Sheets

(51) Int. Cl.

| | | |
|---|---|---|
| *H01M 4/131* | (2010.01) | |
| *H01M 4/133* | (2010.01) | |
| *H01M 4/134* | (2010.01) | |
| *H01M 4/36* | (2006.01) | |
| *H01M 4/48* | (2010.01) | |
| *H01M 4/505* | (2010.01) | |
| *H01M 4/587* | (2010.01) | |
| *H01M 10/052* | (2010.01) | |
| *H01M 10/0587* | (2010.01) | |
| *H01M 50/107* | (2021.01) | |
| *H01M 50/533* | (2021.01) | |
| *H01M 50/586* | (2021.01) | |
| *H01M 4/02* | (2006.01) | |

(52) U.S. Cl.
CPC ........... *H01M 4/134* (2013.01); *H01M 4/364* (2013.01); *H01M 4/483* (2013.01); *H01M 4/505* (2013.01); *H01M 4/587* (2013.01); *H01M 10/052* (2013.01); *H01M 10/0587* (2013.01); *H01M 50/107* (2021.01); *H01M 50/533* (2021.01); *H01M 50/586* (2021.01); *C01P 2002/50* (2013.01); *C01P 2004/03* (2013.01); *C01P 2004/52* (2013.01); *C01P 2004/61* (2013.01); *C01P 2004/62* (2013.01); *C01P 2006/40* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2012/0177963 A1* | 7/2012 | Lee | H01M 10/0431 |
| | | | 429/94 |
| 2014/0162119 A1 | 6/2014 | Takei et al. | |
| 2016/0293944 A1* | 10/2016 | Yoon | H01M 4/483 |
| 2021/0005875 A1 | 1/2021 | Lee et al. | |
| 2021/0098776 A1 | 4/2021 | Kageura et al. | |
| 2021/0226209 A1 | 7/2021 | Kadowaki et al. | |
| 2021/0344033 A1 | 11/2021 | Park et al. | |
| 2021/0408537 A1 | 12/2021 | Hwang et al. | |
| 2022/0029152 A1 | 1/2022 | Lee et al. | |
| 2022/0181615 A1 | 6/2022 | Lee et al. | |
| 2022/0311103 A1* | 9/2022 | Findlay | H01M 50/526 |
| 2024/0387857 A1 | 11/2024 | Park et al. | |

FOREIGN PATENT DOCUMENTS

| | | | |
|---|---|---|---|
| CN | 112768680 A | 5/2021 | |
| CN | 113169369 A | 7/2021 | |
| CN | 113258218 A | 8/2021 | |
| EP | 2 744 021 A1 | 6/2014 | |
| EP | 3747833 A1 * | 12/2020 | C01G 51/04 |
| EP | 3 852 170 A1 | 7/2021 | |
| JP | 2008-135374 A | 6/2008 | |
| JP | 2001-28274 A | 2/2025 | |
| KR | 10-2012-0030774 A | 3/2012 | |
| KR | 10-2019-0139033 A | 12/2019 | |
| KR | 10-2020-0041625 A | 4/2020 | |
| KR | 10-2020-0059164 A | 5/2020 | |
| KR | 10-2020-0099426 A | 8/2020 | |
| KR | 10-2020-0107843 A | 9/2020 | |
| KR | 10-2020-0107856 A | 9/2020 | |
| KR | 10-2020-0133704 A | 11/2020 | |
| KR | 10-2020-0135356 A | 12/2020 | |
| KR | 10-2021-0093173 A | 7/2021 | |

* cited by examiner

LITHIUM SECONDARY BATTERY

CROSS-REFERENCE TO RELATED APPLICATION

The present application claims the benefit of the priority of Korean Patent Application Nos. 10-2021-0136711, filed on Oct. 14, 2021 and 10-2022-0121172 filed on Sep. 23, 2022, which is hereby expressly incorporated by reference in its entirety.

TECHNICAL FIELD

The present invention relates to a lithium secondary battery, and more specifically, to a lithium secondary battery in which a positive electrode active material having single particles or quasi-single particles is applied to achieve excellent thermal stability even though the volume increases.

BACKGROUND ART

With the development of technologies such as electric vehicles and portable electronic devices, the demands for lithium secondary batteries as energy sources are rapidly increasing.

The lithium secondary batteries may be classified into can-type such as cylindrical or prismatic, and pouch-type batteries according to the shapes of battery cases. Among these batteries, can-type batteries are made by covering and sealing the top of a battery can with a cap plate after a jelly-roll type electrode assembly is accommodated in the battery can. The jelly-roll type electrode assembly is manufactured by sequentially stacking a positive electrode plate, a separator, and a negative electrode plate, which have a sheet shape, and then winding the stack in one direction. A positive electrode tab and a negative electrode tab, which have a strip shape, are provided in the positive electrode plate and the negative electrode plate, respectively. The positive electrode tab and the negative electrode tab are connected to electrode terminals and thus electrically connected to external power supplies. For reference, a positive electrode terminal is the cap plate, and a negative electrode terminal is the battery can. However, in the can-type battery having the above structure according to the related art, electric current is concentrated on the electrode tab having a strip shape, and thus, resistance increases, a large amount of heat is generated, and current collecting efficiency deteriorates.

Meanwhile, with the recent advancement of automobile technologies, the demands for high-capacity batteries are increasing. Accordingly, there is a need for developing a large cylindrical battery having a large volume. In a small cylindrical battery generally used in the related art, that is, a cylindrical battery having a form factor of 1865 or 2170, the capacity thereof is small, and thus, resistance or heat generation has not significantly affected battery performance. However, when the specifications of the small cylindrical battery in the related art are directly applied to a large cylindrical battery, there may be a serious problem in battery safety.

When the size of a battery increases, amounts of heat and gas generated inside the battery also increase. The temperature and pressure within the battery rise due to the heat and gas, and the battery may ignite or explode. In order to prevent this, the heat and gas within the battery have to be appropriately discharged to the outside. Thus, the cross-sectional area of the battery serving as a path for discharging the heat to the outside of the battery has to increase with the increase in volume. However, since the increment in cross-sectional area is generally less than the increment in volume, the amount of heat generated within the battery increases as the battery becomes larger. Accordingly, the risk of explosion increases, and the output deteriorates. Also, when quick charging is performed at high voltage, a large amount of heat is generated around an electrode tab for a short period of time, and the battery may ignite.

Thus, in order to achieve high capacity, there is a need for developing a can-type battery exhibiting high safety while having a large volume.

DISCLOSURE OF THE INVENTION

Technical Problem

In order to solve the above problems, the present invention provides a lithium secondary battery in which single particles and/or quasi-single particles are applied as a positive electrode active material to achieve excellent thermal stability even though the volume of the cylindrical battery increases.

Technical Solution

According to one example, the present invention provides a lithium secondary battery including: an electrode assembly in which a positive electrode plate, a negative electrode plate, and a separator interposed between the positive electrode plate and the negative electrode plate are wound in one direction; a battery can in which the electrode assembly is accommodated; and a sealing body which seals an open end of the battery can, wherein the positive electrode plate includes positive electrode active material comprising single particles, quasi-single particles, or a combination thereof, and the positive electrode active material has $D_{min}$ of 1.0 μm or more.

Also, the positive electrode active material may include a lithium nickel-containing oxide that includes 80 mol % or more of Ni on the basis of the total number of moles of transition metal, and for example, may include a lithium nickel-containing oxide represented by Chemical Formula 1 below.

$$Li_a Ni_b Co_c M^1_d M^2_e O_2 \quad \text{[Chemical Formula 1]}$$

where, in Chemical Formula 1, $M^1$ is Mn, Al, or a combination thereof, $M^2$ is Zr, W, Ti, Mg, Ca, Sr, and Ba, $0.8 \leq a \leq 1.2$, $0.83 \leq b < 1$, $0 < c < 0.17$, $0 < d < 0.17$, and $0 \leq e \leq 0.1$ Meanwhile, the negative electrode plate may include a silicon-containing negative electrode active material.

Also, the negative electrode plate may include a silicon-containing negative electrode active material and a carbon-containing negative electrode active material. Here, the silicon-containing negative electrode active material and the carbon-containing negative electrode active material may be provided in a weight ratio of 1:99 to 20:80.

Meanwhile, the cylindrical secondary battery may have a ratio of form factor (a value obtained by dividing a diameter of a cylindrical battery by a height, that is, defined as a ratio of a diameter Φ to a height H) of 0.4 or more and may be, for example, a 46110 cell, a 4875 cell, a 48110 cell, a 4880 cell, or a 4680 cell.

Also, in the secondary battery according to the present invention, each of the positive electrode plate and the negative electrode plate may include an uncoated portion in which an active material layer is not formed, and at least a portion of the positive electrode plate or negative electrode plate of the uncoated portion may define an electrode tab.

The positive electrode plate-uncoated portion and the negative electrode plate-uncoated portion may be positioned along an end of one side of the positive electrode plate and an end of one side of the negative electrode plate, respectively, which are parallel to a direction in which the electrode assembly is wound. A current collecting plate may be coupled to each of the positive electrode plate-uncoated portion and the negative electrode plate-uncoated portion, and the current collecting plate may be connected to an electrode terminal.

Meanwhile, the positive electrode plate-uncoated portion and the negative electrode plate-uncoated portion may be processed in a form of a plurality of segments that are independently bendable, and at least a portion of the plurality of segments may define the electrode tab and be bent toward a winding center C of the electrode assembly. Also, at least a portion of the plurality of bent segments may be overlapped on an upper end and a lower end of the electrode assembly, and the current collecting plate may be coupled to the plurality of overlapped segments.

Meanwhile, on the positive electrode plate, an insulating layer may be further provided, which covers a portion of the positive electrode active material layer and a portion of the uncoated portion along a direction parallel to the winding direction.

According to another example, the present invention provides: a battery pack including a lithium secondary battery according to the present invention; and an automobile including the battery pack.

Advantageous Effects

In a lithium secondary battery according to the present invention, positive electrode active material including single particles and/or quasi-single particles is applied as a positive electrode active material, and thus, the generation of gas due to breakage of particles when the battery is manufactured and the generation of internal cracks during charging and discharging may be minimized. Accordingly, excellent safety may be achieved even in a large battery having an increased volume.

Also, the lithium secondary battery according to the present invention uses the positive electrode active material having $D_{min}$ of 1.0 μm or more, and thus the thermal stability of the cylindrical battery may be further improved. According to the studies of the inventors, even when the single particles and/or the quasi-single particles are used as the positive electrode active material, it was found that the effects of suppressing the breakage of particles and improving thermal stability after rolling the positive electrode active material was different depending on the particle size thereof. In particular, when particles having a particle diameter of 1.0 μm or less are included in the positive electrode active material, the breakage of particles may increase due to an increase in nip pressure in the rolling process, and the thermal stability may be deteriorated, and thus thermal stability may not be sufficiently secured when applied in the large cylindrical battery. Therefore, in the present invention, the effect of improving thermal stability may be maximized by using the positive electrode active material having the minimum particle size ($D_{min}$) that is controlled to be 1.0 μm or more.

Also, in the lithium secondary battery according to the present invention, the positive electrode active material, in which $D_{50}$, $D_{max}$, and the particle size distribution (PSD) are properly controlled, is applied. Thus, an increase in resistance due to the application of single particle may be minimized, and accordingly, excellent capacity characteristics and output characteristics may be achieved.

Also, in the lithium secondary battery according to the present invention, a silicon-containing negative electrode active material having a large capacity may be included as a negative electrode active material. In this case, the higher energy density may be achieved.

Also, the lithium secondary battery according to the present invention may have a structure, in which uncoated portions of a positive electrode plate and a negative electrode plate serve as electrode tabs, for example, a tab-less structure. A cylindrical battery according to the related art has a structure in which an electrode plate is connected to an electrode lead via an electrode tab. In this case, as a large amount of electric current is concentrated on the electrode tab during charging, a large amount of heat is generated around the electrode tab. In particular, this phenomenon is exacerbated during quick charging, and thus, there is a risk of battery ignition or explosion. On the other hand, the lithium secondary battery according to an embodiment of the present invention may have a structure in which the uncoated portion not having an active material layer is formed at the end of each of the positive electrode plate and the negative electrode plate. The uncoated portion is connected to an electrode terminal by being attached, for example being welded, to a current collecting plate having a large cross-sectional area. The battery having the above structure has less current concentration than a battery having an electrode tab according to the related art, and thus may effectively reduce heat generation inside the battery. Accordingly, improvement in the thermal stability of the battery may be obtained.

MODE FOR CARRYING OUT THE INVENTION

Figure 1:
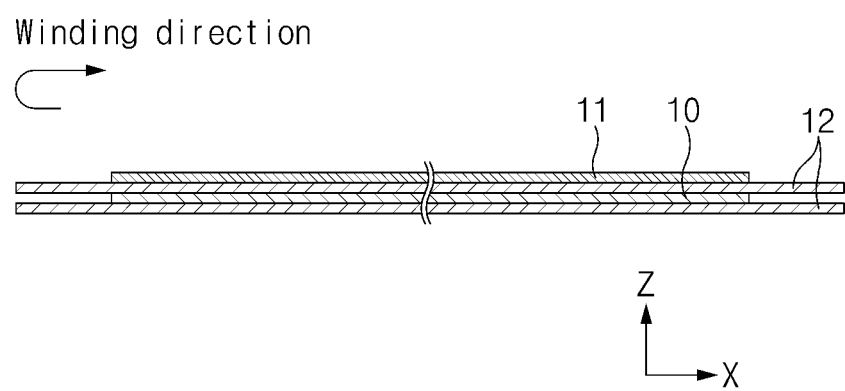
FIG. 1 is a view showing a stacking state before an electrode assembly according to the present invention is wound.

Hereinafter, the present invention will be described more specifically.

Terms or words used in this specification and claims should not be restrictively interpreted as ordinary meanings or dictionary-based meanings, but should be interpreted as meanings and concepts conforming to the technical spirit of the present invention on the basis of the principle that an inventor can properly define the concept of a term to describe and explain his or her invention in the best ways.

In the present invention, a "primary particle" represents a particle unit that has no observable grain boundary when observed in a field of view at a magnification of 5000x to 20000x using a scanning electron microscope or Electron Back Scatter Diffraction (EBSD). An "average particle diameter of primary particle" represents an arithmetic mean value obtained by measuring and calculating particle diameters of primary particles which are observed in the scanning electron microscope image or EBSD image.

In the present invention, a "secondary particle" is a particle formed by aggregation of a plurality of primary particles. In the present invention, a secondary particle in which no more than 10 primary particles are aggregated is referred to as a quasi-single particle in order to be distinguished from a secondary particle in the related art which is formed by aggregation of several tens to hundreds of primary particles.

In the present invention, "$D_{min}$", "$D_{50}$", and "$D_{max}$" are values of particle sizes in volume accumulation distribution of positive electrode active material, which are measured by using a laser diffraction method. Specifically, $D_{min}$ is a minimum particle size shown in the volume accumulation distribution, $D_{50}$ is a particle size when the volume accumulation is 50%, and $D_{max}$ is a maximum particle size shown in the volume accumulation distribution. For example, positive electrode active material is dispersed in a dispersion medium, and then input into a commercial laser diffraction particle size measurement instrument (e.g., Microtrac MT 3000) and irradiated with ultrasonic waves having a frequency of about 28 kHz and an output of 60 W to obtain a volume accumulated particle size distribution graph, thereby measuring the values of particle sizes in the volume accumulation distribution.

As a result of repeated studies to develop a large battery having excellent safety while exhibiting high capacity, the inventors have found that the safety of the large battery can be significantly enhanced by using, as a positive electrode active material, the positive electrode active material comprising primary particles and/or a quasi-single particles that are an aggregate of no more than 10 primary particles. Through this, an aspect of the present invention has been made.

Specifically, a lithium secondary battery according to the present invention includes: an electrode assembly in which a positive electrode plate, a negative electrode plate, and a separator interposed between the positive electrode plate and the negative electrode plate are wound in one direction; a battery can in which the electrode assembly is accommodated; and a sealing body which seals an open end of the battery can.

Hereinafter, the configuration of the lithium secondary battery according to the present invention will be described in detail.

Electrode Assembly

The electrode assembly may have a structure in which the positive electrode plate, the negative electrode plate, and the separator interposed between the positive electrode plate and the negative electrode plate are wound in one direction. For example, the electrode assembly may be jelly-roll type electrode assembly.

Figure 2:
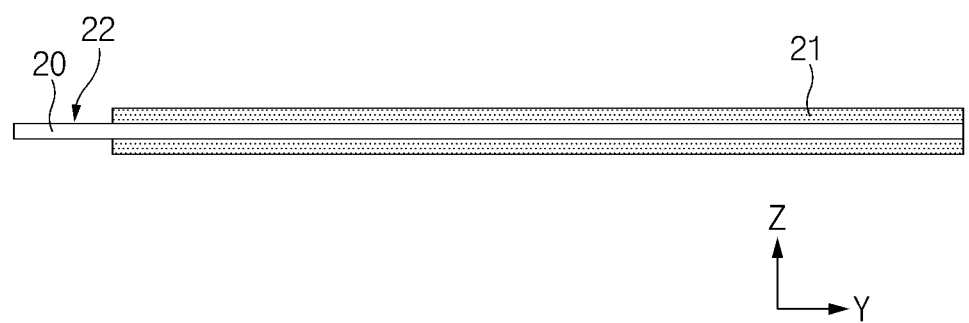
FIG. 2 is a cross-sectional view showing a structure of an electrode plate of an electrode assembly according to an embodiment of the present invention.

FIG. 1 illustrates a stacking structure before the electrode assembly according to the present invention is wound, and FIG. 2 illustrates a cross-sectional structure of an electrode plate (a positive electrode plate or a negative electrode plate) according to the present invention.

Referring to FIGS. 1 and 2, an electrode assembly of the present invention may be manufactured by winding a stack in one direction X, and the stack is formed by sequentially stacking a separator 12, a positive electrode plate 10, a separator 12, and a negative electrode plate 11 at least one time.

Here, each of the positive electrode plate 10 and the negative electrode plate 11 has a structure in which an active material layer 21 is formed on a current collector 20 having a sheet shape, and a partial region of the current collector 20 may have an uncoated portion 22 in which the active material layer 21 is not formed.

As described above, when the positive electrode plate 10 and the negative electrode plate 11 including the uncoated portion 22 are used, it is possible to obtain a battery having a tab-less structure which does not have a separate electrode tab and in which at least a portion of the uncoated portions of the positive electrode plate 10 and the negative electrode plate 11 define electrode tabs.

Specifically, the uncoated portion 22 may be formed at an end of one side of the current collector 20 and elongated along a winding direction X. A current collecting plate is coupled to each of the positive electrode plate-uncoated portion and the negative electrode plate-uncoated portion, and the current collecting plate is connected to an electrode terminal. Through this, the battery having the tab-less structure may be obtained.

For example, the battery having the tab-less structure may be manufactured through the following method. First, the separator, the positive electrode plate, the separator, and the negative electrode plate are sequentially stacked such that uncoated portions 22 of the positive electrode plate 10 and the negative electrode plate 11 are positioned in opposite directions, and are then stacked in one direction to manufacture an electrode assembly. Next, the uncoated portions 22 of the positive electrode plate and the negative electrode plate are bent in a direction toward a winding center C, and then, a current collecting plate is welded and coupled to each of the uncoated portion of the positive electrode plate and the uncoated portion of the negative electrode plate. The current collecting plate is connected to an electrode terminal, and accordingly, the battery having the tab-less structure may be manufactured. Meanwhile, the current collecting plate has a larger cross-sectional area than a strip-type electrode tab, and resistance is inversely proportional to the cross-sectional area of a path through which current flows. Thus, when the secondary battery is formed in the structure described above, cell resistance may be significantly reduced.

Meanwhile, the positive electrode plate-uncoated portion and the negative electrode plate-uncoated portion may be processed in a form of a plurality of segments that are independently bendable, and at least a portion of the plurality of segments may be bent toward the winding center C of the electrode assembly.

The segments may be formed by processing the current collectors of the positive electrode plate and the negative electrode plate through metal foil cutting processes such as laser notching, ultrasonic cutting, and punching.

When the uncoated portions of the positive electrode plate and the negative electrode plate are processed into a form of the plurality of segments, stress acting on the uncoated portion when bent may be reduced to prevent deformation or damage to the uncoated portion, thus improving welding characteristics with the current collecting plate.

The current collecting plate and the uncoated portion are generally bonded to each other, for instance through welding, and in order to enhance the welding characteristics, the uncoated portion has to be bent evenly as much as possible by applying intense pressure to a welding surface of the uncoated portion. However, during this bending process, the shape of the uncoated portion may be irregularly distorted and deformed. The deformed region may come into contact with an electrode of the opposite polarity, causing an internal short-circuit or microcracks in the uncoated portion. However, when the uncoated portions of the positive electrode plate and the negative electrode plate are processed into a form of a plurality of segments independently bendable, stress acting on the uncoated portions during the bending may be relieved, thereby minimizing deformation and damage to the uncoated portions.

In addition, when the uncoated portion is processed in the form of segments as described above, the plurality of segments overlap with each other during the bending, thereby increasing welding strength with the current collecting plate. When advanced technology such as laser welding is used, the laser may penetrate into the electrode assembly and prevent a problem that the separator or the active material are melted and evaporated. Preferably, at least a portion of the plurality of bent segments may be overlapped on an upper end and a lower end of the electrode assembly, and the current collecting plate may be coupled to the plurality of overlapped segments.

Figure 5:
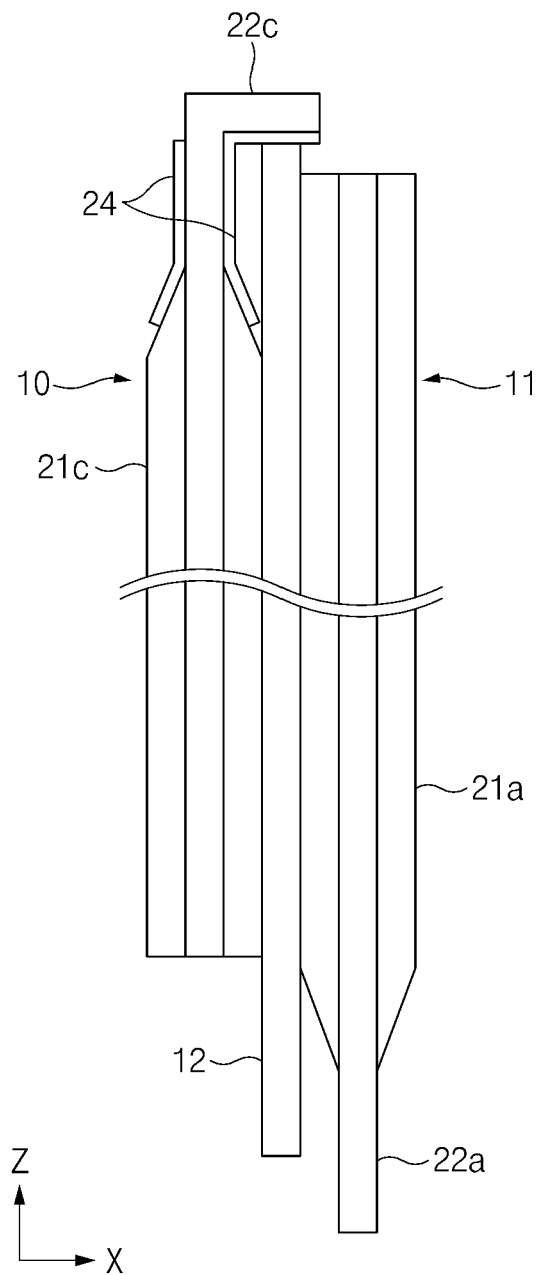
FIG. 5 is a view for describing a structure of an electrode assembly according to an example of the present invention.

Meanwhile, the electrode assembly according to the present invention may have a structure in which an insulating layer 24 is further formed on a positive electrode plate 10 as illustrated in FIG. 5. Specifically, the insulating layer 24 may be formed to cover a portion of a positive electrode active material layer and a portion of an uncoated portion along a direction parallel to a winding direction of an electrode assembly.

In the case of the battery having the tab-less structure in which an uncoated portion 22c of the positive electrode plate 10 and an uncoated portion 22a of a negative electrode plate 11 are used as electrode tabs, an electrode assembly is formed such that the positive electrode plate 10 may protrude upward from a separator 12 and the negative electrode plate 11 may protrude downward from the separator 12, and the protruding positive electrode plate 10 and/or negative electrode plate 11 are bent and then coupled to a current collecting plate. However, when the positive electrode plate 10 or the negative electrode plate 11 are bent as described above, a current collector of the positive electrode plate 10 or the negative electrode plate 11 crosses the separator and is positioned close to the electrode of the opposite polarity. Due to this, there is a possibility that the positive electrode plate and the negative electrode plate are brought into electrical contact with other and cause an internal short circuit. However, as illustrated in FIG. 5, when the insulating layer 24 covering a portion of the positive electrode active material layer and the uncoated portion is formed, the insulating layer 24 may prevent the positive electrode plate 10 and the negative electrode plate 11 from coming into electrical contact with each other, thereby preventing a short-circuit from occurring inside the battery.

Preferably, the insulating layer 24 may be provided on at least one surface of the current collector of the positive electrode plate 10, preferably, may be provided on each of both surfaces of the positive electrode plate 10.

In addition, the insulating layer 24 may be formed in a region of the positive electrode plate 10 that is likely to face an active material layer 21a of the negative electrode plate 11. For example, on a surface facing the negative electrode plate 11 after being bent in the uncoated portion 22c of the positive electrode plate 10, the insulating layer 24 may be formed to extend to a distal end of the uncoated portion 22c. However, for the opposite surface to the surface facing the negative electrode plate 11 after being bent, it is desirable the insulating layer 24 is formed only in a portion of the uncoated portion 22c, for example, before arriving at a bending point of the uncoated portion 22c. This is because, when the insulating layer 24 is formed on the entire region of the uncoated portion on the opposite surface to the surface facing the negative electrode plate 11, electrical contact with the current collecting plate is impossible and thus the uncoated portion cannot function as an electrode tab.

Meanwhile, a material or component of the insulating layer 24 is not particularly limited as long as it can be attached to the positive electrode plate while ensuring insulating performance. For example, the insulating layer may be an insulating coating layer or an insulating tape, and the insulating coating layer may include an organic binder and inorganic particles. Here, the organic binder may be, for example, styrene butadiene rubber (SBR), and the inorganic particles may be alumina oxide, but is not limited thereto.

Next, each of components of the electrode assembly of the present invention will be described in detail.

(1) Positive Electrode Plate

The positive electrode plate may have a structure, for example, in which a positive electrode active material layer is formed on one surface or both surfaces of a positive electrode current collector having a sheet shape, and the positive electrode active material layer may include positive electrode active material and selectively include a conductive material and/or a binder.

Specifically, a positive electrode slurry is manufactured by dispersing the positive electrode active material, the conductive material, and/or the binder in a solvent such as dimethyl sulfoxide (DMSO), isopropyl alcohol, N-methylpyrrolidone (NMP), acetone, and water. The positive electrode slurry is applied on one surface or both surfaces of the positive electrode current collector having a sheet shape, and the solvent of the positive electrode slurry is removed through a drying process. Then, the positive electrode plate may be manufactured through a rolling process. Meanwhile, during the application of the positive electrode slurry, the positive electrode slurry is not applied to a partial region of the positive electrode current collector, for example, one end of the positive electrode current collector. Through this, the positive electrode plate having the uncoated portion may be manufactured.

Various positive electrode current collectors used in the art may be used as the positive electrode current collector. For example, stainless steel, aluminum, nickel, titanium, baked carbon, or aluminum or stainless steel which is surface-treated with carbon, nickel, titanium, silver, or the like may be used as the positive electrode current collector. The positive electrode current collector may typically have a thickness of 3 µm to 500 µm, and fine protrusions and recesses may be formed on the surface of the positive electrode current collector to increase adhesive force of the positive electrode active material. The positive electrode current collector may be used in various forms, for example, films, sheets, foils, nets, porous structures, foams, and non-woven fabrics.

In the present invention, the positive electrode plate includes the positive electrode active material, which is made of single particles that are made of primary single particles and/or a quasi-single particles that are an aggregate of no more than 10 primary particles.

According to the related art, a spherical secondary particle, in which several tens to hundreds of primary particles are aggregated, has been generally used as a positive electrode active material of a lithium secondary battery. However, regarding the positive electrode active material having the secondary particle type in which lots of primary particles are aggregated as described above, breakage of particles occurs, and the primary particles are peeled off in a rolling process while a positive electrode is manufactured. Also, cracks inside particles are generated during charging and discharging. When the breakage of particles or cracks inside particles of the positive electrode active material occurs, the contact area with an electrolyte increases. Thus, gas generation due to a side reaction with the electrolyte increases. When the gas generation increases inside the battery, the pressure within the battery increases. Thus, there is a risk of battery explosion. Particularly, when the volume of the cylindrical battery increases, an amount of active material inside the battery increases due to the increase in volume. Accordingly, an amount of gas generation also increases significantly, and thus there is a higher risk of ignition and/or explosion of the battery.

On the other hand, the positive electrode active material having a single particle type made of primary particles or quasi-single particles in which no more than 10 primary particles are aggregated has higher particle strength than the existing positive electrode active material having a secondary particle type in which several tens to hundreds of primary particles are aggregated. Thus, particle breakage during the rolling hardly occurs. Also, regarding the positive electrode active material having single particles and/or quasi-single particles, the number of primary particles constituting a particle is small. Thus, a change during charging and discharging due to volume expansion and contraction of primary particles is small, and accordingly, crack generation inside the particles is significantly reduced.

Thus, when the positive electrode active material comprising single particles and/or quasi-single particles is used as in the present invention, an amount of gas generation due to particle breakage and internal crack generation may be significantly reduced, and accordingly, the excellent safety may be achieved even in the large battery.

Meanwhile, the single particles and/or the quasi-single particles, may be present in an amount of 95 wt % to 100 wt %, preferably 98 wt % to 100 wt %, more preferably 99 wt % to 100 wt %, and still more preferably 100 wt %, on the basis of the weight of all the positive electrode active material present in the positive electrode active material layer. When the content of the single particles and/or the quasi-single particles satisfies the above range of 95 wt % to 100 wt %, sufficient safety may be obtained when applied in the large battery. When the positive electrode active material in the form of a secondary particle is included in an amount exceeding 5 wt % of the entire positive electrode active material, side reactions with the electrolyte increase due to the generated from secondary particles during electrode manufacturing and charging/discharging, and the effect of suppressing gas generation decreases. Accordingly, the stability improvement effect may be reduced when applied in the large battery.

Meanwhile, in the positive electrode active material in the form of the single particles and/or the quasi-single particles according to the present invention, $D_{min}$ may be 1.0 µm or more, 1.1 µm or more, 1.15 µm or more, 1.2 µm or more, 1.25 µm or more, 1.3 µm or more, 1.35 µm or more, 1.4 µm or more, 1.45 µm or more, or 1.5 µm or more. When $D_{min}$ of the positive electrode active material powder is less than 1.0 µm, breakage of particles may easily occur due to an increase in nip pressure during a rolling process of the positive electrode plate, and thermal stability may be deteriorated. Thus, thermal stability may not be sufficiently secured when applied in a large cylindrical battery.

Meanwhile, in terms of resistance and output characteristics, Dmin of the positive electrode active material may be 3 µm or less, 2.5 µm or less, or 2 µm. When $D_{min}$ is too large, the lithium ion diffusion distance within the particles may increase, resulting in deterioration of resistance and output characteristics.

For example, $D_{min}$ of the positive electrode active material may be 1.0 µm to 3 µm, 1.0 µm to 2.5 µm, or 1.3 µm to 2.0 µm. Meanwhile, $D_{50}$ of the positive electrode active material may be 5 µm or less, 4 µm or less, or 3 µm or less, for example, 0.5 µm to 5 µm, preferably 1 µm to 5 µm, more preferably 2 µm to 5 µm. In the positive electrode active material having the single particles and/or quasi-single particles, an interface between the primary particles serving as a diffusion path of lithium ions inside the particle is small. Thus, lithium mobility is degraded compared to the positive electrode active material having the secondary particle type, and accordingly, the resistance increases. This increase in resistance is more intensified as the size of particles increases. When the resistance increases, capacity and output characteristics are adversely affected. Thus, $D_{50}$ of the positive electrode active material may be controlled to be 5 µm or less to minimize the diffusion distance of lithium ions inside the positive electrode active material particles, thereby suppressing an increase in resistance.

Also, $D_{max}$ of the positive electrode active material may be in the range of 12 µm to 17 µm, preferably 12 µm to 16 µm, more preferably 12 µm to 15 µm. When $D_{max}$ of the positive electrode active material satisfies this range of 12 µm to 17 µm, the resistance and capacity characteristics become more excellent.

When aggregation between single particles occurs, $D_{max}$ of the positive electrode active material increases. When $D_{max}$ of the positive electrode active material is too large, the lithium movement path inside the particles is lengthened, and lithium mobility is degraded, which may increase the resistance. Meanwhile, when the excessive crushing occurs, $D_{max}$ of the positive electrode active material decreases. When $D_{max}$ of the positive electrode active material is too small, $D_{min}$ of the positive electrode active material may be less than 1.0 µm, and thus breakage of particles may easily occur during a rolling process of the positive electrode plate, and thermal stability may be deteriorated.

Meanwhile, a particle size distribution (PSD) of the positive electrode active material is represented by Equation 1 below and may have a value of 3 or less, preferably 2 to 3, more preferably 2.3 to 3:

Particle size distribution(PSD)=$(D_{max}-D_{min})/D_{50}$  [Equation 1].

When the positive electrode active material has the particle size distribution described above, it is possible to appropriately maintain the electrode density of the positive electrode and effectively suppress breakage of particles and an increase in resistance.

Meanwhile, in the positive electrode active material, an average particle diameter of primary particles may be 5 μm or less, 4 μm or less, 3 μm or less, or 2 μm or less, for example, 0.5 μm to 5 μm, preferably 1 μm to 5 μm, or more preferably 2 μm to 5 μm. When the average particle diameter of primary particles satisfies this range of 5 μm or less, the positive electrode active material having the single particle and/or quasi-single particle type exhibiting excellent electrochemical properties may be formed. When the average particle diameter of primary particles is very small, the aggregation number of primary particles forming the positive electrode active material becomes larger, and the effect of suppressing generation of particle breakage during the rolling is degraded. When the average particle diameter of primary particles is very large, the lithium diffusion path inside the primary particle becomes longer, the resistance may increase, and the output characteristics may be degraded.

In the present invention, it is preferable that the positive electrode active material has a unimodal particle size distribution. According to the related art, a bimodal positive electrode active material has been widely used to enhance electrode density of the positive electrode active material layer. A large particle diameter-positive electrode active material having a large average particle diameter and a small particle diameter-positive electrode active material having a small average particle diameter are mixed and used in bimodal positive electrode active material. However, regarding the positive electrode active material having the single particles or quasi-single particles, the lithium movement path becomes longer when the particle diameter increases, and thus, the resistance increases significantly. Thus, when particles having a large particle diameter are mixed and used, the capacity and output characteristics may be degraded. Thus, the positive electrode active material having the unimodal distribution is used in the present invention, and thus, an increase in resistance may be minimized.

Meanwhile, the positive electrode active material may include a lithium nickel-containing oxide, and specifically, may include a lithium nickel-containing oxide that includes 80 mol % or more of Ni on the basis of the total number of moles of transition metal present in the lithium nickel-containing oxide. Preferably, the lithium nickel-containing oxide may include Ni in an amount of 80 mol % or more and less than 100 mol %, 82 mol % or more and less than 100 mol %, or 83 mol % or more and less than 100 mol %. When the lithium nickel-containing oxide containing high Ni contents is used as described above, high capacity may be achieved.

More specifically, the positive electrode active material may include a lithium nickel-containing oxide represented by Chemical Formula 1 below:

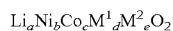  [Chemical Formula 1].

In Chemical Formula 1, $M^1$ may be Mn, Al, or a combination thereof, preferably Mn or Mn and Al.

$M^2$ may be one or more selected from the group consisting of Zr, W, Y, Ba, Ca, Ti, Mg, Ta, and Nb, preferably one or more selected from the group consisting of Zr, Y, Mg, and Ti, more preferably Zr, Y, or a combination thereof. The $M^2$ element is not necessarily included, but may serve to promote grain growth during firing or improve stability of crystal structure when an appropriate amount thereof is included.

The a represents a mole fraction of lithium in the lithium nickel-containing oxide, and it may satisfy that $0.8 \le a \le 1.2$, $0.85 \le a \le 1.15$, or $0.9 \le a \le 1.2$. When the mole fraction of lithium satisfies this range, the crystal structure of the lithium nickel-containing oxide may be stably formed.

The b represents a mole fraction of nickel among all metals except for the nickel in the lithium nickel-containing oxide, and it may satisfy that $0.8 \le b < 1$, $0.82 \le b < 1$, $0.83 \le b < 1$, $0.85 \le b < 1$, $0.88 \le b < 1$ or $0.90 \le b < 1$. When the mole fraction of nickel satisfies this range, high energy density appears, and it is possible to achieve high capacity.

The c represents a mole fraction of cobalt among all metals except for the nickel in the lithium nickel-containing oxide, and it may satisfy that $0 < c < 0.2$, $0 < c < 0.18$, $0.01 \le c \le 0.17$, $0.01 \le c \le 0.15$, $0.01 \le c \le 0.12$ or $0.01 \le c \le 0.10$. When the mole fraction of cobalt satisfies this range, favorable resistance characteristics and output characteristics may be achieved.

The d represents a mole fraction of $M^1$ elements among all metals except for the nickel in the lithium nickel-containing oxide, and it may satisfy that $0 < d < 0.2$, $0 < d < 0.18$, $0.01 \le d \le 0.17$, $0.01 \le d \le 0.15$, $0.01 \le d \le 0.12$, or $0.01 \le d \le 0.10$. When the mole fraction of $M^1$ elements satisfies this range, structural stability of the positive electrode active material appears excellent.

The e represents a mole fraction of $M^2$ elements among all metals except for the nickel in the lithium nickel-containing oxide, and it may satisfy that $0 \le e \le 0.1$ or $0 \le e \le 0.05$.

Meanwhile, the positive electrode active material according to the present invention may further include, on the particle surface of the lithium nickel-containing oxide as necessary, a coating layer that includes one or more coating elements selected from the group consisting of Al, Ti, W, B, F, P, Mg, Ni, Co, Fe, Cr, V, Cu, Ca, Zn, Zr, Nb, Mo, Sr, Sb, Bi, Si, and S. Preferably, the coating element may be Al, B, Co, or a combination thereof.

When the coating layer is present on the particle surface of the lithium nickel-containing oxide, contact between an electrolyte and a lithium composite transition metal oxide is suppressed by the coating layer. Accordingly, elution of a transition metal due to side reaction with the electrolyte or generation of gas may be reduced.

The positive electrode active material may be included in an amount of 80 wt % to 99 wt % based on the total weight of the positive electrode active material layer, preferably 85 wt % to 99 wt %, more preferably 90 wt % to 99 wt %.

Next, the conductive material is used to impart conductivity to an electrode and is not particularly limited as long as it has electron electrical conductivity without causing a chemical change in a battery to be constituted. For specific examples, there may be: graphite such as natural graphite and artificial graphite; carbon-containing materials such as carbon black, acetylene black, Ketjen black, channel black, furnace black, lamp black, thermal black, a carbon fiber, and a carbon nanotube; metal powder or a metal fiber such as copper, nickel, aluminum, and silver; a conductive whisker such as a zinc oxide and a potassium titanate; a conductive metal oxide such as a titanium oxide; or an electrically conductive polymer such as a polyphenylene derivative.

Among these, any one or a mixture of two or more may be used. The conductive material may be typically included in an amount of 1 wt % to 30 wt % based on the total weight of the positive electrode active material layer, preferably 1 wt % to 20 wt %, more preferably 1 wt % to 10 wt %.

The binder serves to enhance attachment between particles of the positive electrode active material and an adhesive force between the positive electrode active material and the positive electrode current collector. For specific examples, there may be polyvinylidene fluoride (PVDF), vinylidene-co-hexafluoropropylene (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene-monomer (EPDM rubber), sulfonated EPDM, styrene butadiene rubber (SBR), fluoro rubber, or various copolymers thereof. Among these, any one or a mixture of two or more may be used. The binder may be typically included in an amount of 1 wt % to 30 wt % based on the total weight of the positive electrode active material layer, preferably 1 wt % to 20 wt %, more preferably 1 wt % to 10 wt %.

Meanwhile, on the positive electrode plate according to the present invention, an insulating layer for covering a portion of the positive electrode active material layer and the uncoated portion may be further formed as necessary. The insulating layer may be formed along a direction parallel to a winding direction of an electrode assembly.

(2) Negative Electrode Plate

The negative electrode plate may have a structure in which a negative electrode active material layer is formed on one surface or both surfaces of a negative electrode current collector having a sheet shape, and the negative electrode active material layer may include a negative electrode active material, a conductive material, and a binder.

Specifically, a negative electrode slurry is manufactured by dispersing the negative electrode active material, the conductive material, and the binder in a solvent such as dimethyl sulfoxide (DMSO), isopropyl alcohol, N-methylpyrrolidone (NMP), acetone, and water. The negative electrode slurry is applied on one surface or both surfaces of the negative electrode current collector having a sheet shape, and the solvent of the negative electrode slurry is removed through a drying process. Then, the negative electrode plate may be manufactured through a rolling process. Meanwhile, during the application of the negative electrode slurry, the negative electrode slurry is not applied to a partial region of the negative electrode current collector, for example, one end of the negative electrode current collector. Through this, the negative electrode plate having the uncoated portion may be manufactured.

A compound capable of reversibly intercalating and deintercalating lithium may be used as the negative electrode active material. For specific examples of the negative electrode active material, there may be: a carbonaceous material such as artificial graphite, natural graphite, graphitized carbon fibers, and amorphous carbon; a silicon-containing material such as Si, Si-Me alloy (where, Me is one or more selected from the group consisting of Al, Sn, Mg, Cu, Fe, Pb, Zn, Mn, Cr, Ti, and Ni), $SiO_y$ (where, $0<y<2$), and a Si—C composite; a lithium metal thin film; and a metallic material such as Sn and Al, capable of forming an alloy with lithium. Among these, any one or a mixture of two or more may be used.

Preferably, the negative electrode plate according to the present invention may include a silicon-containing negative electrode active material. The silicon-containing negative electrode active material may be Si, Si-Me alloy (where, Me is one or more selected from the group consisting of Al, Sn, Mg, Cu, Fe, Pb, Zn, Mn, Cr, Ti, and Ni), $SiO_y$ (where, $0<y<2$), a Si—C composite, or a combination thereof, preferably $SiO_y$ (where, $0<y<2$). The silicon-containing negative electrode active material has a high theoretical capacity. Thus, when the silicon-containing negative electrode active material is included, the capacity characteristics may be enhanced.

Meanwhile, the silicon-containing negative electrode active material may be doped with $M^b$ metal. Here, the $M^b$ metal may be a Group 1 metal element or a Group 2 metal element, and specifically, may be Li, Mg, or the like. Specifically, the silicon-negative electrode active material may be Si, $SiO_y$ (where, $0<y<2$), a Si—C composite, or the like, which is doped with the $M^b$ metal. Regarding the silicon-containing negative electrode active material doped with the metal, the capacity of active material is slightly degraded due to the doping elements, but efficiency becomes high. Thus, the high energy density may be achieved.

Also, the silicon-containing negative electrode active material may further include a carbon coating layer on the particle surface. Here, an amount of carbon coating may be 20 wt % or less on the basis of the total weight of the silicon-containing negative electrode active material, preferably 1 to 20 wt %.

Also, the negative electrode plate may further include a carbon-containing negative electrode active material as the negative electrode active material, as necessary. The carbon-containing negative electrode active material may be, for example, artificial graphite, natural graphite, graphitized carbon fibers, amorphous carbon, soft carbon, hard carbon, or the like, but is not limited thereto.

Meanwhile, when a mixture of the silicon-containing negative electrode active material and the carbon-containing negative electrode active material is used as the negative electrode active material, a mixing ratio between the silicon-containing negative electrode active material and the carbon-containing negative electrode active material may be 1:99 to 20:80, preferably 1:99 to 15:85, more preferably 1:99 to 10:90 in terms of weight.

The negative electrode active material may be included in an amount of 80 wt % to 99 wt % based on the total weight of the negative electrode active material layer, preferably 85 wt % to 99 wt %, more preferably 90 wt % to 99 wt %.

Meanwhile, negative electrode current collectors generally used in the art may be used as the negative electrode current collector. For example, copper, stainless steel, aluminum, nickel, titanium, baked carbon, copper or stainless steel which is surface-treated with carbon, nickel, titanium, or silver, an aluminum-cadmium alloy, or the like may be used. The negative electrode current collector may typically have a thickness of 3 μm to 500 μm, and similar to the positive electrode current collector, fine protrusions and recesses may be formed on the surface of the current collector to reinforce adhesive force of the negative electrode active material. For example, various forms such as films, sheets, foils, nets, porous structures, foams, and non-woven fabrics may be used.

The conductive material is used to impart conductivity to a negative electrode and is not particularly limited as long as it has electron electrical conductivity without causing a chemical change in a battery to be constituted. For specific examples, there may be: graphite such as natural graphite and artificial graphite; carbon-containing materials such as carbon black, acetylene black, Ketjen black, channel black, furnace black, lamp black, thermal black, a carbon fiber, and a carbon nanotube; metal powder or a metal fiber such as copper, nickel, aluminum, and silver; a conductive whisker such as a zinc oxide and a potassium titanate; a conductive metal oxide such as a titanium oxide; or an electrically conductive polymer such as a polyphenylene derivative. Among these, any one or a mixture of two or more may be used. The conductive material may be typically included in an amount of 1 wt % to 30 wt % based on the total weight of the negative electrode active material layer, preferably 1 wt % to 20 wt %, more preferably 1 wt % to 10 wt %.

The binder serves to enhance attachment between particles of the negative electrode active material and an adhesive force between the negative electrode active material and the negative electrode current collector. For specific examples, there may be polyvinylidene fluoride (PVDF), vinylidene-co-hexafluoropropylene (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene-monomer (EPDM rubber), sulfonated EPDM, styrene butadiene rubber (SBR), fluoro rubber, or various copolymers thereof. Among these, any one or a mixture of two or more may be used. The binder may be typically included in an amount of 1 wt % to 30 wt % based on the total weight of the negative electrode active material layer, preferably 1 wt % to 20 wt %, more preferably 1 wt % to 10 wt %.

(3) Separator

The separator separates the negative electrode and the positive electrode and provides a movement passage of lithium ions, and is not particularly limited as long as it is typically used as a separator in a lithium secondary battery.

Specifically, porous polymer films, for example, porous polymer films prepared with polyolefin-based polymers such as an ethylene homopolymer, a propylene homopolymer, an ethylene/butene copolymer, an ethylene/hexene copolymer, and an ethylene/methacrylate copolymer may be used as the separator, or a laminate structure having two or more layers thereof may be used. In addition, a conventional porous non-woven fabric, for example, a non-woven fabric which is made of glass fiber having a high melting point, polyethyleneterephthalate fiber, or the like, may be used as a separator. In addition, to ensure thermal resistance or mechanical strength, a coated separator including a ceramic component or a polymer material may be used.

Lithium Secondary Battery

Next, the lithium secondary battery according to the present invention will be described.

A battery according to the present invention may include: an electrode assembly in which a positive electrode plate, a negative electrode plate, and a separator interposed between the positive electrode plate and the negative electrode plate are wound in one direction; a battery can in which the electrode assembly is accommodated; and a sealing body which seals an open end of the battery can.

Preferably, the lithium secondary battery according to the present invention may be cylindrical battery. More preferably, the lithium secondary battery may be a large cylindrical battery having a ratio of form factor of 0.4 or more (a value obtained by dividing a diameter of a cylindrical battery by a height, that is, defined as a ratio of a diameter $\Phi$ to a height H). Here, the form factor represents a value that indicates the diameter and height of the cylindrical battery.

The cylindrical battery according to the present invention may be, for example, a 46110 cell (diameter 46 mm, height 110 mm, and form factor ratio 0.418), a 4875 cell (diameter 48 mm, height 75 mm, and form factor ratio 0.640), a 48110 cell (diameter 48 mm, height 110 mm, and form factor ratio 0.436), a 4880 cell (diameter 48 mm, height 80 mm, and form factor ratio 0.600), and a 4680 cell (diameter 46 mm, height 80 mm, and form factor ratio 0.575). In numerical values indicating the form factor, the first two numbers indicate the diameter of cell, and the next two or three numbers indicate the height of cell.

In the lithium secondary battery according to the present invention, the positive electrode active material having the single particles and/or quasi-single particles is applied, and thus, the amount of gas generation is significantly reduced when compared to the related art. Accordingly, the excellent safety may be achieved even in the large cylindrical battery having the ratio of form factor of 0.4 or more.

Meanwhile, the lithium secondary battery according to the present invention may be a battery having a tab-less structure not including an electrode tab, preferably, but is not limited thereto.

The battery having the tab-less structure may have, for example, a structure in which each of the positive electrode plate and the negative electrode plate includes an uncoated portion in which the active material layer is not formed. A positive electrode plate-uncoated portion and a negative electrode plate-uncoated portion are positioned in an upper end and a lower end of the electrode assembly, respectively. A current collecting plate is coupled to each of the positive electrode plate-uncoated portion and the negative electrode plate-uncoated portion. The current collecting plate is connected to an electrode terminal.

Figure 3:
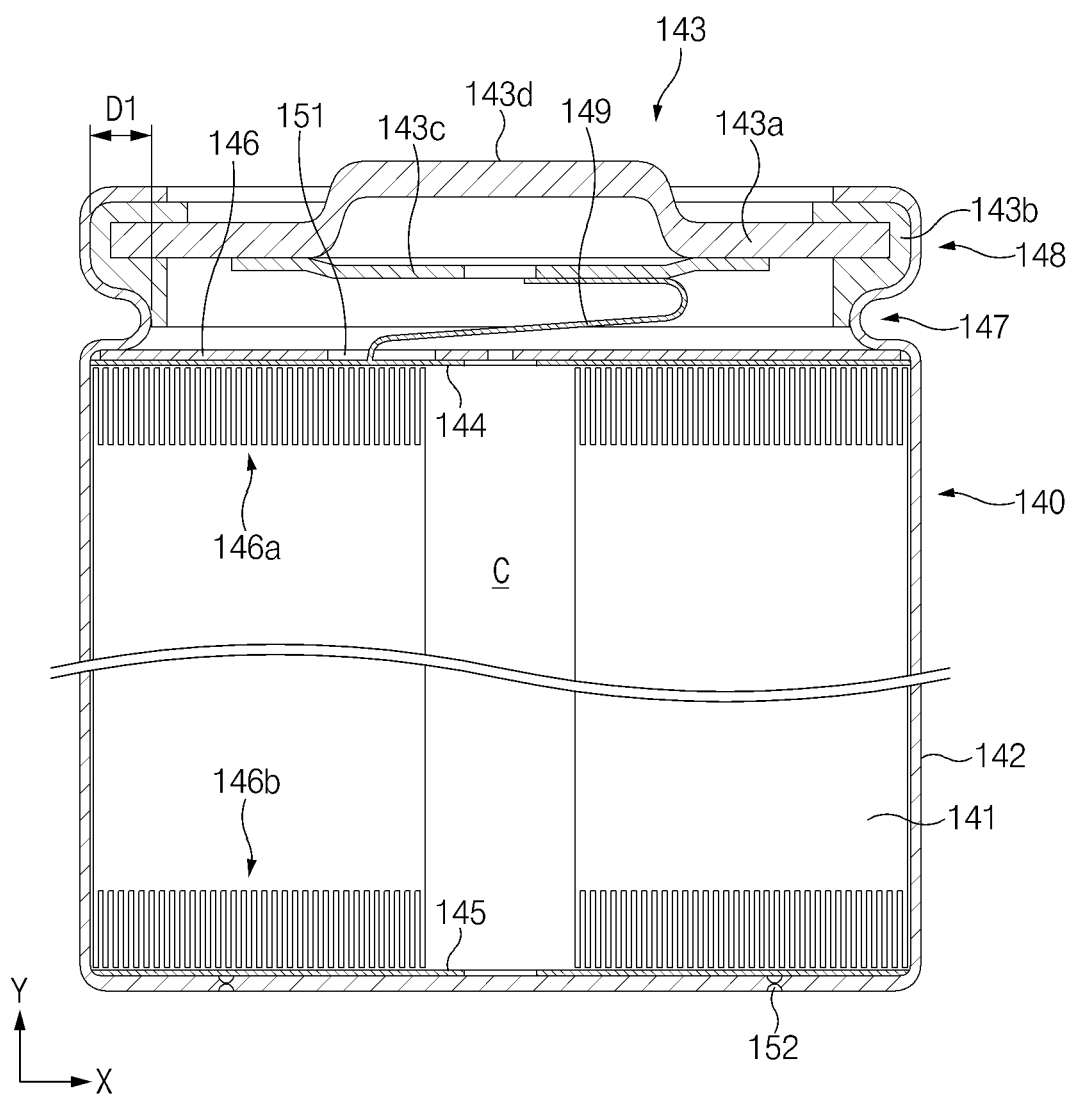
FIG. 3 is a cross-sectional view showing a structure of a battery having a tab-less structure according to an embodiment of the present invention.

FIG. 3 illustrates a cross-sectional view of the battery having the tab-less structure according to an embodiment of the present invention. Hereinafter, the battery according to an embodiment of the present invention will be described with reference to FIG. 3. However, FIG. 3 merely shows an embodiment of the present invention, and the structure of the battery of the present invention is not limited to the scope illustrated in FIG. 3.

A battery 140 according to an embodiment of the present invention includes an electrode assembly 141 having the jelly-roll type structure, a battery can 142 in which the electrode assembly 141 is accommodated, and a sealing body 143 which seals an open end of the battery can 142.

Here, each of the positive electrode plate and the negative electrode plate of the electrode assembly may include the uncoated portion in which the active material layer is not formed, and may be stacked and wound such that the positive electrode plate-uncoated portion and the negative electrode plate-uncoated portion are positioned in the upper end and the lower end of the electrode assembly, respectively. The electrode assembly has been described above, and thus hereinafter, other components except for the electrode assembly will be described only.

The battery can 142 is a container having an opening formed on the upper side, and made of a conductive metal material such as aluminum or steel. The battery can accommodates the electrode assembly 141 in the inner space through the upper opening, and accommodates an electrolyte together.

As the electrolyte used in the present invention, various electrolytes, which can be used in a lithium secondary battery, for example, an organic liquid electrolyte, an inorganic liquid electrolyte, a solid polymer electrolyte, a gel-like polymer electrolyte, a solid inorganic electrolyte, or a melt inorganic electrolyte may be used. However, the type thereof is not particularly limited.

Specifically, the electrolyte may include an organic solvent and a lithium salt.

The organic solvent is not particularly limited as long as it can serve as a medium in which ions involved in an electrochemical reaction of a battery are migrated. Specifically, an ester-based solvent such as methyl acetate, ethyl acetate, γ-butyrolactone or ε-caprolactone; an ether-containing solvent such as dibutyl ether or tetrahydrofuran; a ketone-containing solvent such as cyclohexanone; an aromatic hydrocarbon-containing solvent such as benzene or fluorobenzene; a carbonate-containing solvent such as dimethylcarbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol, isopropyl alcohol; a nitrile such as R—CN (where R is a linear, branched, or cyclic C2-C20 hydrocarbon group, and may include a double bond, an aromatic ring, or an ether bond); an amide such as dimethylformamide; a dioxolane such as 1,3-dioxolane; or a sulfolane may be used as the organic solvent. Among these, preferably, the carbonate-containing solvent is used. More preferably, a mixture of a cyclic carbonate (e.g., ethylene carbonate or propylene carbonate), which has a high ionic conductivity and a high dielectric constant to improve charge/discharge performance of a battery, and a low viscosity linear carbonate-containing compound (e.g., ethylmethyl carbonate, dimethyl carbonate, or diethyl carbonate) is used.

The lithium salt is not particularly limited as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The lithium salt may be used at a concentration ranging from 0.1 to 5.0 M, preferably, from 0.1 to 3.0 M. When the concentration of the lithium salt is included within this range of 0.1 to 5.0 M, the electrolyte has an appropriate conductivity and viscosity. Thus, excellent electrolyte performance may be achieved, and the lithium ions may effectively migrate.

In addition to these electrolyte components, the electrolyte may further include an additive for the purpose of improving the life characteristics of the battery, suppressing the reduction of the battery capacity, and improving the discharge capacity of the battery. For example, a haloalkylene carbonate-containing compound such as difluoroethylene carbonate, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, or the like may be used as the additive, and any one or a mixture thereof may be used. However, the additive is not limited thereto. The additive may be included in an amount of 0.1 wt % to 10 wt % based on the total weight of the electrolyte, preferably 0.1 wt % to 5 wt %.

The battery can 142 is electrically connected to an uncoated portion 146b of the negative electrode plate, and contacts an external power source and serves as a negative electrode plate terminal that delivers current, which has been applied from the external power source to the negative electrode plate.

As necessary, a beading portion 147 and a crimping portion 148 may be provided in the upper end of the battery can 142. The beading portion 147 may be formed by pressing the perimeter of outer circumferential surface of the battery can 142 to a distance D1. The beading portion 147 prevents the electrode assembly 141, which is accommodated inside the battery can 142, from escaping through the upper opening of the battery can 142, and may serve as a support on which the sealing body 143 is seated.

The crimping portion 148 may be formed above the beading portion 147 and has a shape that extends and bends to surround a portion of the outer circumferential surface of a cap plate 143a disposed above the beading portion 147 and a portion of the top surface of the cap plate 143a.

Next, the sealing body 143 seals an open end of the battery can 142, and includes a cap plate 143a and a first gasket 143b that provides air-tightness to a space between the cap plate 143a and the battery can 142 and has insulating characteristics, and as necessary, may further include a connection plate 143c electrically and mechanically coupled to the cap plate 143a. The cap plate 143a may be pressed against the beading portion 147 formed in the battery can 142 and fixed by the crimping portion 148.

The cap plate 143a is a component made of a metal material having electrical conductivity and covers the upper opening of the battery can 142. The cap plate 143a is electrically connected to the positive electrode plate of the electrode assembly 141 and electrically insulated from the battery can 142 through the first gasket 143b. Thus, the cap plate 143a may serve as the positive electrode terminal of the secondary battery. The cap plate 143a may include a protrusion portion 143d that protrudes upward from a central portion C thereof. The protrusion portion 143d contacts the external power source and allows the current to be applied from the external power source.

The first gasket 143b may be interposed between the cap plate 143a and the crimping portion 148 to ensure the air-tightness of the battery can 142 and electrical insulation between the battery can 142 and the cap plate 143a.

Meanwhile, the battery 140 according to the present invention may further include current collecting plates 144 and 145 as necessary. The current collecting plates are coupled to a positive electrode plate-uncoated portion 146a and a negative electrode plate-uncoated portion 146b, and connected to the electrode terminals (i.e., a positive electrode terminal and a negative electrode terminal).

Specifically, the battery 140 according to the present invention may include a first current collecting plate 144 coupled to the upper portion of the electrode assembly 141 and a second current collecting plate 145 coupled to the lower portion of the electrode assembly 141.

The first current collecting plate 144 and/or the second current collecting plate 145 may be further included.

The first current collecting plate 144 is coupled to the upper portion of the electrode assembly 141. The first current collecting plate 144 may be made of a conductive metal material such as aluminum, copper, or nickel, and electrically connected to the uncoated portion 146a of the positive electrode plate. A lead 149 may be connected to the first current collecting plate 144. The lead 149 extends upward from the electrode assembly 141, and may be coupled to the connection plate 143c or directly coupled to the bottom surface of the connection plate 143a. The coupling between the lead 149 and other components may be made through welding. Preferably, the first current collecting plate 144 may be formed integrally with the lead 149. In this case, the lead 149 may have a plate shape that extends outward from the central portion C of the first current collecting plate 144.

Meanwhile, the first current collecting plate 144 is coupled to an end of the uncoated portion 146a of the positive electrode plate. This coupling may be made through laser welding, resistance welding, ultrasonic welding, soldering, or the like.

The second current collecting plate 145 is coupled to the lower portion of the electrode assembly 141. The second current collecting plate 145 may be made of a conductive metal material such as aluminum, copper, or nickel, and electrically connected to the uncoated portion 146b of the negative electrode plate. One surface of the second current collecting plate 145 may be coupled to the uncoated portion 146b of the negative electrode plate, and the other surface may be coupled to the inner bottom surface of the battery can 142. Here, this coupling may be made through laser welding, resistance welding, ultrasonic welding, soldering, or the like.

Meanwhile, the battery 140 according to the present invention may further include an insulator 146 as necessary. The insulator 146 may be disposed to cover the top surface of the first current collecting plate 144. The insulator 146 covers the first current collecting plate 144 and thus may prevent the first current collecting plate 144 and the battery can 142 from coming into direct contact with each other.

The insulator 146 includes a lead hole 151 through which the lead 149 extending upward from the first current collecting plate 144 can be drawn out. The lead 149 is drawn out upward through the lead hole 151 and coupled to the bottom surface of the connection plate 143c or the bottom surface of the cap plate 143a.

The insulator 146 may be made of polymer resin having insulating characteristics, for example, a polymer resin material such as polyethylene, polypropylene, polyimide, or polybutylene terephthalate.

Meanwhile, the battery 140 according to the present invention may further include a venting portion 152 formed in the bottom surface of the battery can 142 as necessary. The venting portion 152 corresponds to a region of the bottom surface of the battery can 142, which has a smaller thickness compared to peripheral regions. The venting portion 152 has a small thickness and is thus structurally weak compared to the peripheral regions. Thus, when the pressure within the battery 140 rises to a certain level or higher, the venting portion 152 is ruptured, and the gas within the battery can 152 is discharged to the outside, thereby preventing the battery from exploding.

Figure 4:
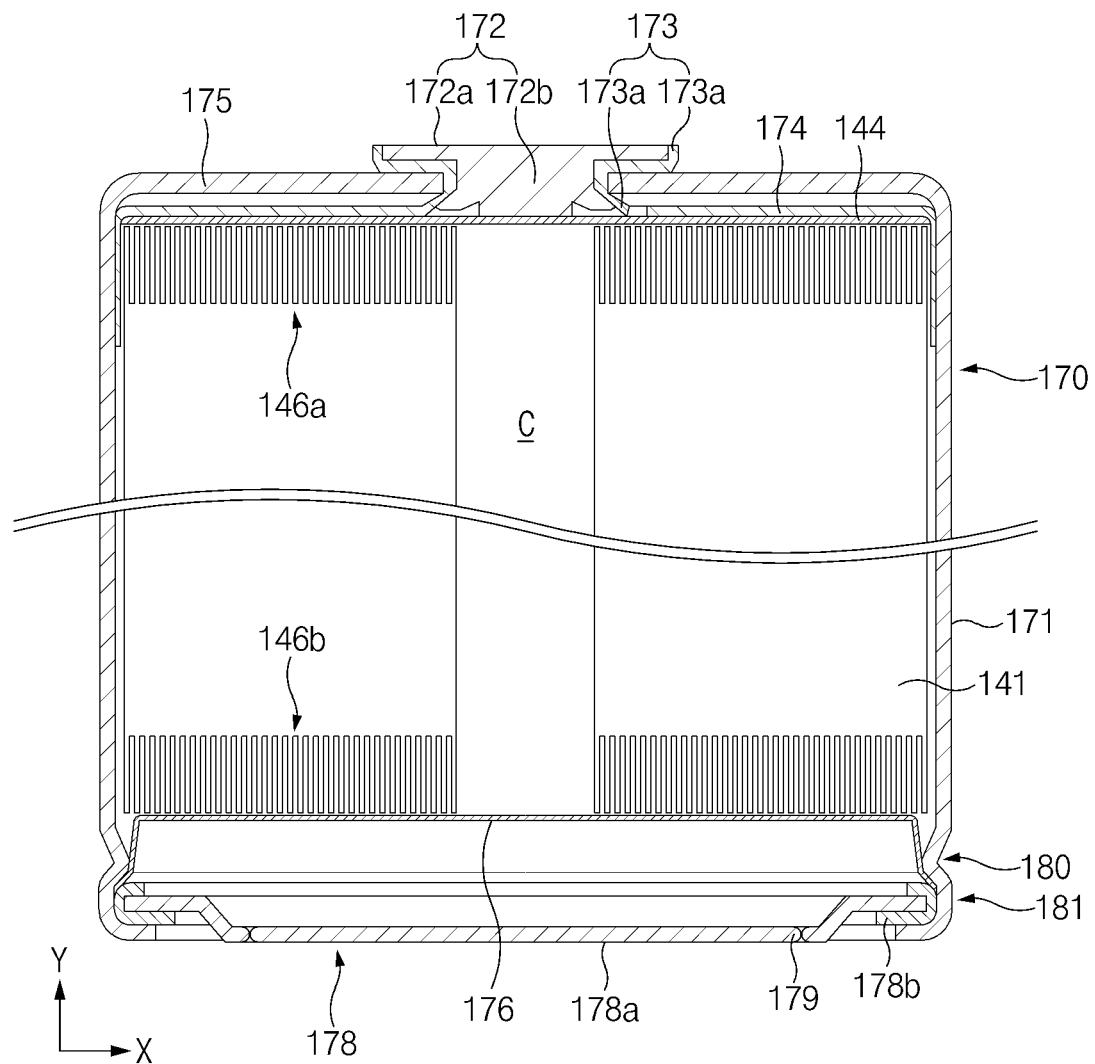
FIG. 4 is a cross-sectional view showing a structure of a battery having a tab-less structure according to another embodiment of the present invention.

FIG. 4 illustrates a cross-sectional view of a battery having a tab-less structure according to another embodiment of the present invention. Hereinafter, the battery according to another embodiment of the present invention will be described with reference to FIG. 4. However, FIG. 4 merely shows an embodiment of the present invention, and the structure of the battery of the present invention is not limited to the scope illustrated in FIG. 4.

Referring to FIG. 4, a battery 170 according to another embodiment of the present invention is different from structures of a battery can and a sealing body when compared to the battery 140 illustrated in FIG. 3, but the configurations of an electrode assembly and an electrolyte are substantially the same as each other.

Specifically, the battery 170 includes a battery can 171 through which a rivet terminal 172 passes and installed. The rivet terminal 172 is installed on the partially closed surface (the upper surface in the drawing) of the battery can 171, which is partially closed at one distal end thereof. The rivet terminal 172 is riveted in a through-hole (a first opening of a first distal end) of the battery can 171 in a state in which a second gasket 173 having insulating characteristics is interposed therebetween. The rivet terminal 172 is exposed outward in a direction opposite to the direction of gravity.

The rivet terminal 172 includes a terminal exposure portion 172a and a terminal insertion portion 172b. The terminal exposure portion 172a is exposed outward from the partially closed surface of the battery can 171. The terminal exposure portion 172a may be positioned at an approximately central portion C of the partially closed surface of the battery can 171. The maximum diameter of the terminal exposure portion 172a may be formed larger than the maximum diameter of the through-hole formed in the battery can 171. The terminal insertion portion 172b passes through the approximately central portion of the partially closed surface of the battery can 171 and may be electrically connected to the uncoated portion 146a of the positive electrode plate. The terminal insertion portion 172b may be rivet-coupled to the inner surface of the battery can 171. That is, the terminal insertion portion 172b may have a shape curved toward the inner surface of the battery can 171. The maximum diameter of an end of the terminal insertion portion 172b may be greater than the maximum diameter of the through-hole of the battery can 171.

The lower end surface of the terminal insertion portion 172b may be welded to the first current collecting plate 144 connected to the uncoated portion 146a of the positive electrode plate. An insulating cap 174 made of an insulating material may be interposed between the first current collecting plate 144 and the inner surface of the battery can 171. The insulating cap 174 covers the upper portion of the first current collecting plate 144 and the upper end edge portion of the electrode assembly 141. Accordingly, it is possible to prevent a short-circuit from occurring as an uncoated portion on the outer circumference of the electrode assembly 141 comes into contact with the inner surface of the battery can 171 having different polarity. The terminal insertion portion 172b of the rivet terminal 172 passes through the insulating cap 174 and may be welded to the first current collecting plate 144.

The second gasket 173 is interposed between the battery can 171 and the rivet terminal 172 and prevents electrical contact between the battery can 171 and the rivet terminal 172 which have polarities different from each other. Accordingly, the top surface of the rivet terminal 172 having an approximately flat shape may serve as a positive electrode terminal of the battery 170.

The second gasket 173 includes a gasket exposure portion 173a and a gasket insertion portion 173b. The gasket exposure portion 173a is interposed between the terminal exposure portion 172a of the rivet terminal 172 and the battery can 171. The gasket insertion portion 173b is interposed between the terminal insertion portion 172b of the rivet terminal 172 and the battery can 171. Upon riveting the terminal insertion portion 172b, the gasket insertion portion 173b may be deformed together and come into close contact with the inner surface of the battery can 171. The second gasket 173 may be made of, for example, polymer resin having insulating characteristics.

The gasket exposure portion 173a of the second gasket 173 may have a shape that extends to cover the outer circumferential surface of the terminal exposure portion 172a of the rivet terminal 172. When the second gasket 173 covers the outer circumferential surface of the rivet terminal 172, it is possible to prevent a short-circuit from occurring during a process of coupling an electrical connection component such as a bus bar to the top surface of the battery can 171 and/or the rivet terminal 172. Although not illustrated, the gasket exposure portion 173a may have a shape that extends to cover a portion of the top surface of the terminal exposure portion 172a as well as the outer circumferential surface thereof.

When the second gasket 173 is made of polymer resin, the second gasket 173 may be coupled to the battery can 171 and the rivet terminal 172 by thermal fusion. In this case, the air-tightness may be reinforced on the coupling interface between the second gasket 173 and the rivet terminal 172 and the coupling interface between the second gasket 173 and the battery can 171. Meanwhile, when the gasket exposure portion 173a of the second gasket 173 has a shape that extends to the top surface of the terminal exposure portion 172a, the rivet terminal 172 may be integrally coupled to the second gasket 173 through insert injection molding.

Except for the regions occupied by the rivet terminal 172 and the second gasket 173 on the top surface of the battery can 171, the remaining regions 175 correspond to a negative electrode terminal having a polarity opposite to that of the rivet terminal 172.

A second current collecting plate 176 is coupled to the lower portion of the electrode assembly 141. The second current collecting plate 176 may be made of a conductive metal material such as aluminum, steel, copper, or nickel, and electrically connected to the uncoated portion 146b of the negative electrode plate.

Preferably, the second current collecting plate 176 is electrically connected to the battery can 171. To this end, at least a portion of the edge portion of the second current collecting plate 176 may be interposed and fixed between the inner surface of the battery can 171 and a first gasket 178b. In one example, at least a portion of the edge portion of the second current collecting plate 176 may be fixed, through welding, to a beading portion 180 formed at the lower end of the battery can 171 while being supported by the lower end surface of the beading portion 180. In a modified example, at least a portion of the edge portion of the second current collecting plate 176 may be directly welded to the inner wall surface of the battery can 171.

The second current collecting plate 176 may include a plurality of protrusions and recesses formed radially on the surface facing the uncoated portion 146b. When the protrusions and recesses are formed, the protrusions and recesses may be press-fit into the uncoated portion 146b by pressing the second current collecting plate 176.

Preferably, the second current collecting plate 176 and the end of the uncoated portion 146b may be coupled through welding, for example, laser welding.

A sealing body 178 for sealing the lower open end of the battery can 171 includes a cap plate 178a and a first gasket 178b. The first gasket 178b electrically separates the cap plate 178a from the battery can 171. A crimping portion 181 fixes the edge of the cap plate 178a and the first gasket 178b together. A vent portion 179 is provided in the cap plate 178a. The vent portion 179 has substantially the same configuration as the embodiment described above.

Preferably, the cap plate 178a may be made of a conductive metal material. However, since the first gasket 178b is interposed between the cap plate 178a and the battery can 171, the cap plate 178a has no electrical polarity. The sealing body 178 serves to seal a lower open end of the battery can 171 and discharge gas when the internal pressure of the battery cell 170 rises to a threshold value or higher.

Preferably, the rivet terminal 172 electrically connected to the uncoated portion 146a of the positive electrode plate is used as a positive electrode terminal. Also, a portion 175 except for the rivet terminal 172 on the upper surface of the battery can 171 electrically connected to the uncoated portion 146b of the negative electrode plate through the second current collecting plate 176 is used as a negative electrode terminal. As described above, when two electrode terminals are positioned on the upper portion of the battery, it is possible to dispose an electrical connection component such as a bus bar only on one side of the battery 170. This may bring simplification of a battery pack structure and enhancement of energy density. Also, the portion 175 used as the negative electrode terminal has an approximately flat shape, and thus, a sufficient bonding area may be secured when the electrical connection component such as the bus bar is bonded. Accordingly, in the battery 170, resistance at a bonding site for the electrical connection component may be reduced to a preferable level.

When the lithium secondary battery is formed in the tab-less structure described above, the current concentration becomes less than a battery having an electrode tab in the related art, and thus, the heat generation inside the battery may be effectively reduced. Accordingly, the improvement in the thermal stability of the battery may be obtained.

Figure 6:
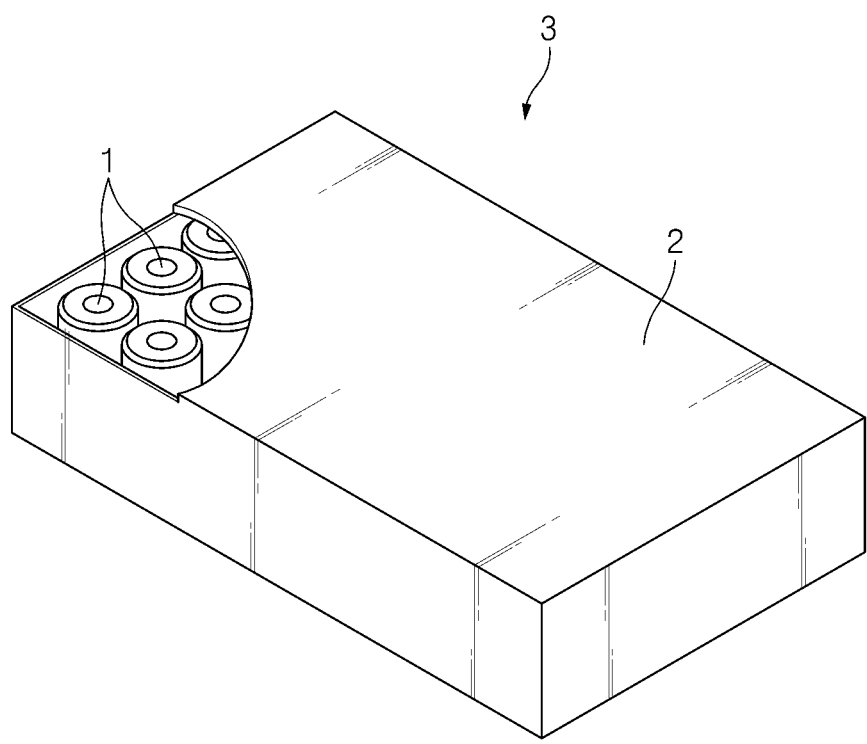
FIG. 6 is a view for describing a battery pack according to the present invention.

The lithium secondary battery according to the present invention as described above may be used to manufacture a battery pack. FIG. 6 schematically illustrates a configuration of the battery pack according to an embodiment of the present invention. Referring to FIG. 6, a battery pack 3 according to an embodiment of the present invention includes: an assembly in which a secondary batteries 1 are electrically connected; and a pack housing 2 accommodating same. A secondary battery 1 is the battery cell according to the embodiment described above. In the drawing, components such as a bus bar for electrically connecting the secondary batteries 1, a cooling unit, and an external terminal are omitted for convenience of illustration.

The battery pack 3 may be mounted to an automobile. The automobile may be, for example, an electric vehicle, a hybrid vehicle, or a plug-in hybrid vehicle. The automobile includes a four-wheel vehicle or a two-wheel vehicle.

Figure 7:
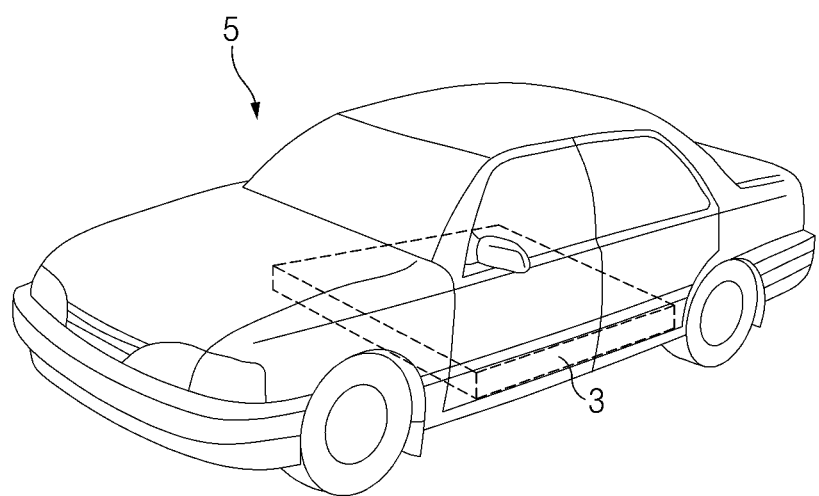
FIG. 7 is a view for describing an automobile including the battery pack according to the present invention.

FIG. 7 is a view for describing an automobile 5 including the battery pack 3 of FIG. 6.

Referring to FIG. 7, an automobile 5 according to an embodiment of the present invention includes a battery pack 3 according to an embodiment of the present invention, and operates by receiving power from the battery pack 3.

Hereinafter, the present invention will be described in more detail with reference to specific embodiments.

Embodiment 1

Figure 8:
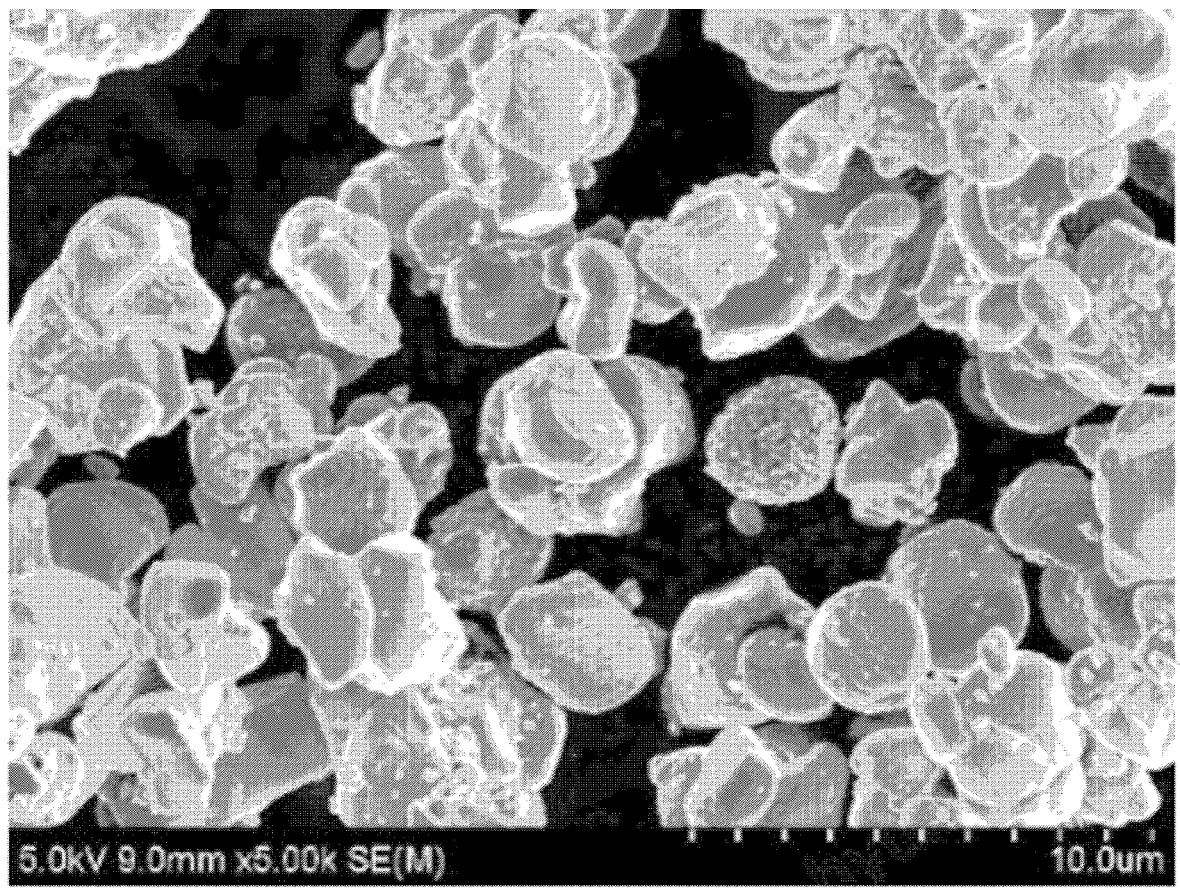
FIG. 8 is a SEM image of positive electrode active material used in Embodiment 1.

A positive electrode active material (composition: $Li[Ni_{0.9}Co_{0.06}Mn_{0.03}Al_{0.01}]O_2$) was prepared, which has a unimodal particle size distribution and in which $D_{min}$=1.78 μm, $D_{50}$=4.23 μm, $D_{max}$=13.1 μm, and single particles and quasi-single particles are mixed. FIG. 8 illustrates a SEM image of the positive electrode active material used in Embodiment 1.

The positive electrode active material, carbon nanotubes, and a PVDF binder were mixed in N-methylpyrrolidone at a weight ratio of 97.8:0.6:1.6. As a result, a positive electrode slurry was manufactured. The positive electrode slurry was applied on one surface of an aluminum current collector sheet, dried at 120° C., and then rolled. As a result, a positive electrode plate was manufactured.

A negative electrode active material (graphite:SiO=95:5 weight ratio mixture), a conductive material (super C), styrene butadiene rubber (SBR), and carboxymethyl cellulose (CMC) were mixed in water at a weight ratio of 96:2:1.5:0.5. As a result, negative electrode slurry was manufactured. The negative electrode slurry was applied on one surface of a copper current collector sheet, dried at 150° C., and then rolled. As a result, a negative electrode plate was manufactured.

A separator was interposed between the positive electrode plate and the negative electrode plate manufactured as described above, and then the separator/positive electrode plate/separator/negative electrode plate were stacked in this order and then wound. As a result, an electrode assembly having a jelly-roll type was manufactured. The electrode assembly manufactured as described above was inserted into a cylindrical battery can, and then, an electrolyte is injected therein. As a result, a 4680 cell was manufactured.

Embodiment 2

A 4680 cell was manufactured through the same method as Embodiment 1, except that positive electrode active material (composition: Li[$Ni_{0.9}Co_{0.06}Mn_{0.03}Al_{0.01}$]$O_2$), which has a unimodal particle size distribution and in which $D_{min}$=1.38 μm, $D_{50}$=4.69 μm, $D_{max}$=18.5 μm, and single particles and quasi-single particles are mixed, was used as the positive electrode active material.

Figure 9:
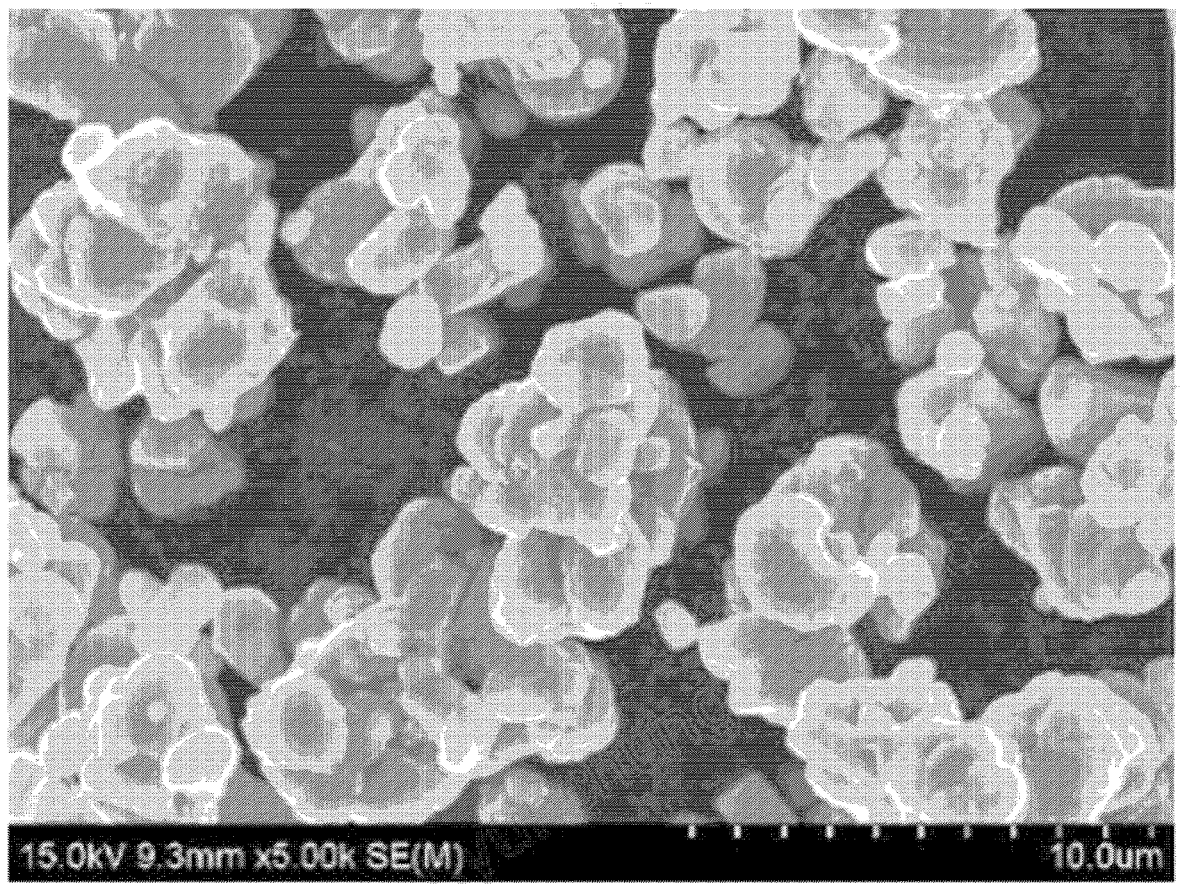
FIG. 9 is a SEM image of positive electrode active material used in Embodiment 2.

FIG. 9 illustrates a SEM image of the positive electrode active material used in Embodiment 2.

Comparative Example 1

A 4680 cell was manufactured through the same method as Embodiment 1, except that positive electrode active material (composition: Li[$Ni_{0.9}Co_{0.05}Mn_{0.04}Al_{0.01}$]$O_2$), which has a secondary particle type and a bimodal particle size distribution in which a large particle-average particle diameter $D_{50}$ is 9 μm and a small particle-average particle diameter $D_{50}$ is 4 μm, was used as the positive electrode active material.

Comparative Example 2

A 4680 cell was manufactured through the same method as Embodiment 1, except that positive electrode active material (composition: Li[$Ni_{0.9}Co_{0.06}Mn_{0.03}Al_{0.01}$]$O_2$), which has a unimodal particle size distribution and in which $D_{min}$=0.892 μm, $D_{50}$=3.02 μm, $D_{max}$=11 μm, and single particles and quasi-single particles are mixed, was used as the positive electrode active material.

Figure 10:
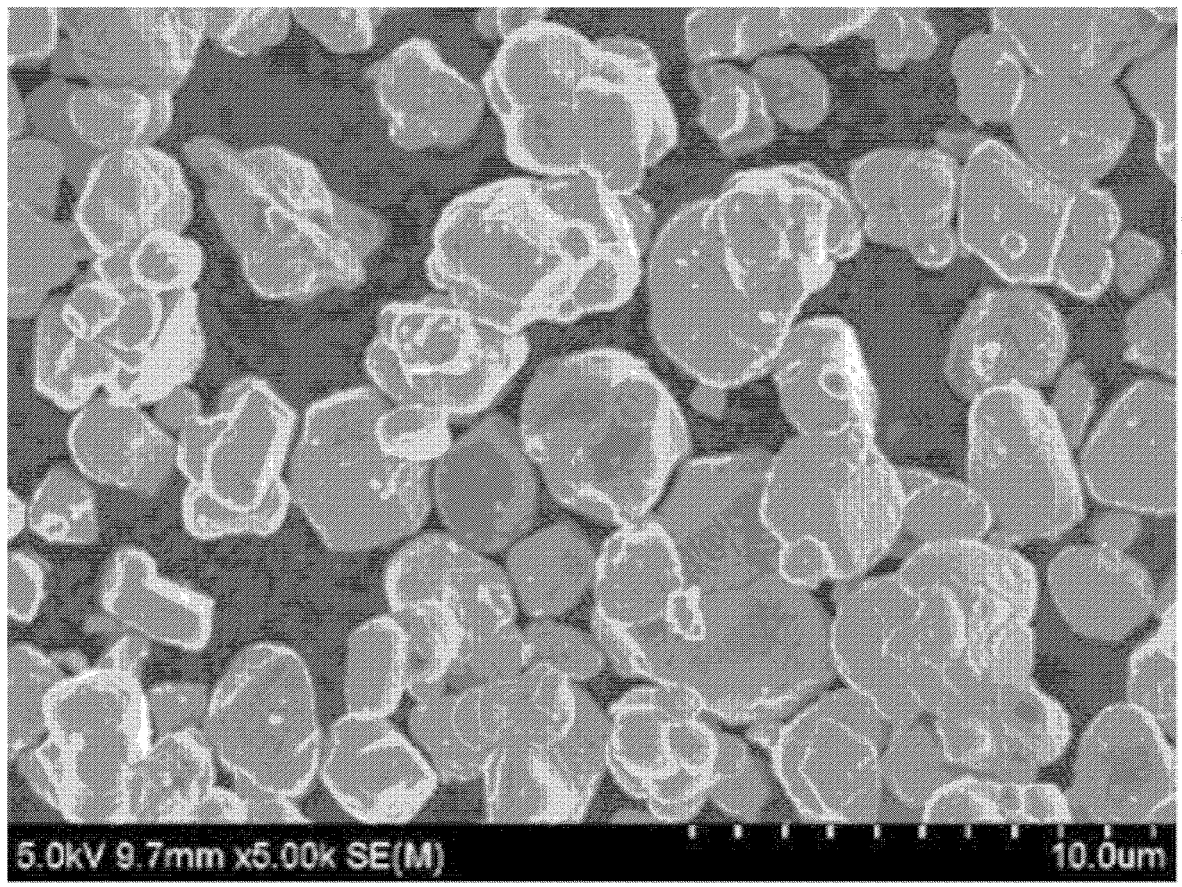
FIG. 10 is a SEM image of positive electrode active material used in Comparative Example 2.

FIG. 10 illustrates a SEM image of the positive electrode active material used in Comparative Example 2.

Experimental Example 1

Hot box tests were performed on the 4680 cells manufactured in Embodiments 1 to 2 and Comparative Examples 1 to 2.

Specifically, each of the 4680 cells manufactured in Embodiment 1 and Comparative Example 1 is put into a hot box chamber at room temperature, heated to 130° C. at a heating rate of 5° C./min, and then maintained for 30 minutes. Then, a change in the temperature of the battery was measured. The case in which thermal runaway and ignition did not occur during the test was denoted as Pass, and the case in which thermal runaway and/or ignition has occurred was denoted as Fail. In addition, for accuracy of the test, the test was performed twice or more for the cells of Embodiments 1 and 2.

Figure 11:
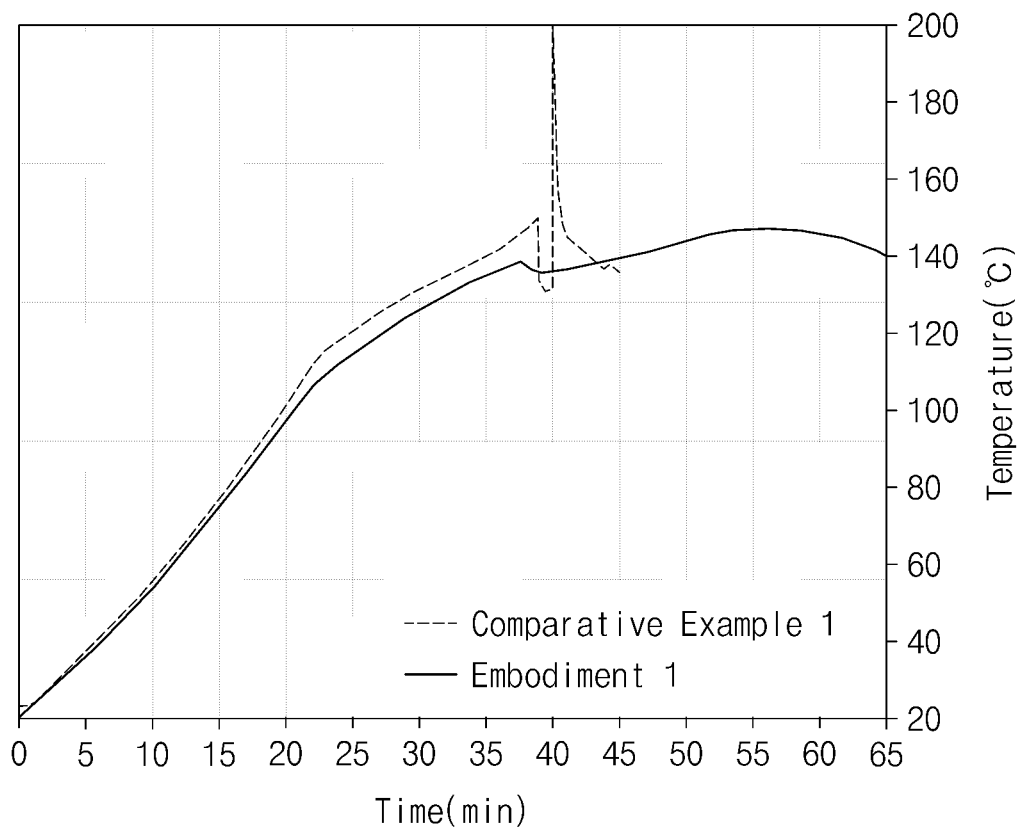
FIG. 11 is a graph showing hot box test results of 4680 cells manufactured by Sample 1 of Embodiment 1 and Comparative Example 1.
Figure 12:
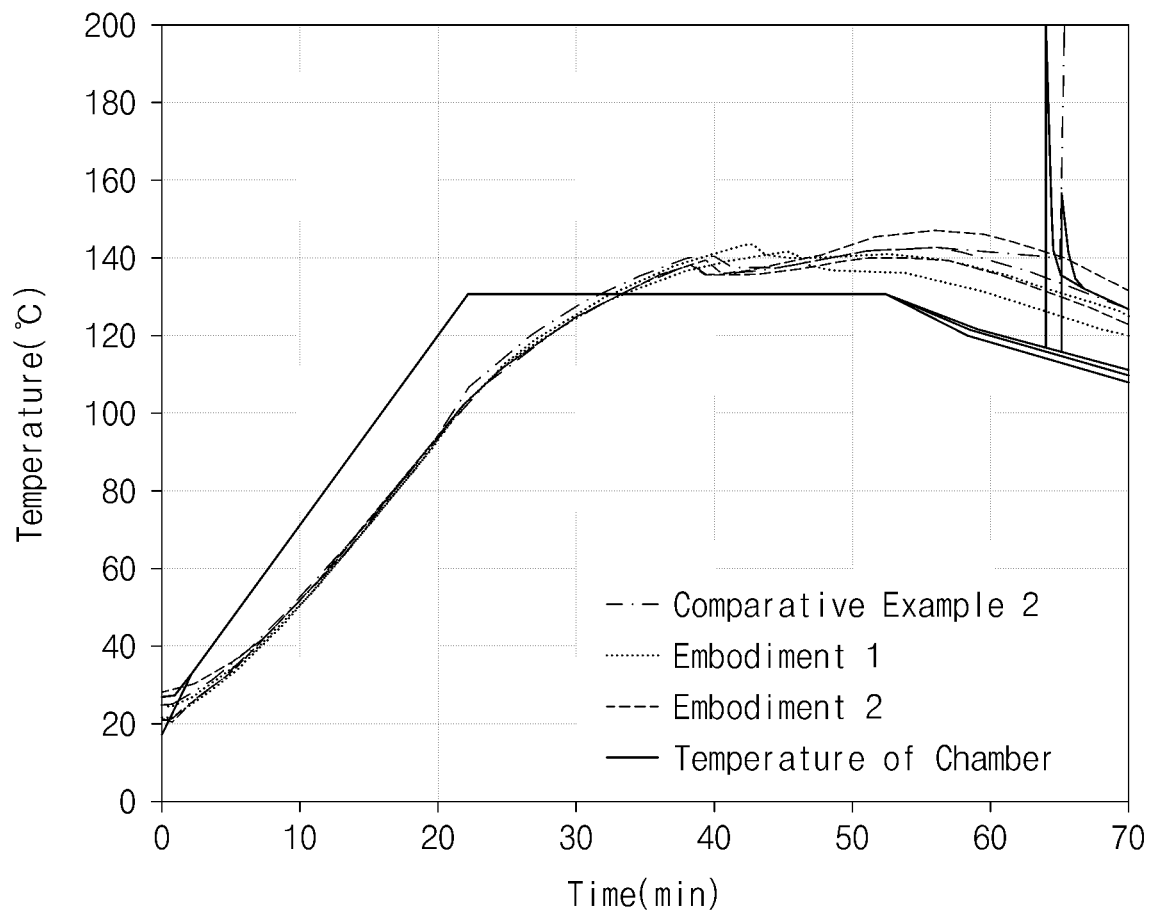
FIG. 12 is a graph showing hot box test results of 4680 cells according to Samples 2 and 3 of Embodiment 1, Samples 1 and 2 of Embodiment 2 and Comparative Example 2.

The measurement results were illustrated in Table 1 and FIGS. 11 and 12. FIG. 11 is a graph showing hot box test results of 4680 cells manufactured by Sample 1 of Embodiment 1 and Comparative Example 1, and FIG. 12 is a graph showing hot box test results of 4680 cells manufactured by Samples 2 and 3 of Embodiment 1, Samples 1 and 2 of Embodiment 2 and Comparative Example 2.

TABLE 1

|  | Sample # | Venting time (minute) | Max temperature (° C.) | Hot box test results |
|---|---|---|---|---|
| Embodiment 1 | 1 | 16 | 139 | Pass |
|  | 2 | 20.9 | 141 | Pass |
|  | 3 | 23.7 | 137 | Pass |
| Embodiment 1 | 2 | 16.0 | 148 | Pass |
|  | 3 | 15.8 | 147 | Pass |
| Comparative Example 1 | 1 | 17 | Unable to measure | Fail |
| Comparative Example 2 | 1 | 16.2 | Unable to measure | Fail |

Referring to Table 1 and FIGS. 11 and 12, in the case of the cylindrical battery of Embodiment 1 in which the positive electrode active material in the form of single particles/quasi-single particles with $D_{min}$ of 1.0 μm or more is utilized, it may be confirmed that the voltage and temperature of the battery are stably maintained until 65 minutes have elapsed. However, in the case of the lithium secondary battery of Comparative Example 1 in which secondary particles are utilized as a positive electrode active material and Comparative Example 2 in which the positive electrode active material in the form of single particles/quasi-single particles with $D_{min}$ less than 1.0 μm is utilized, the battery temperature sharply rises.

Experimental Example 2

Figure 13:
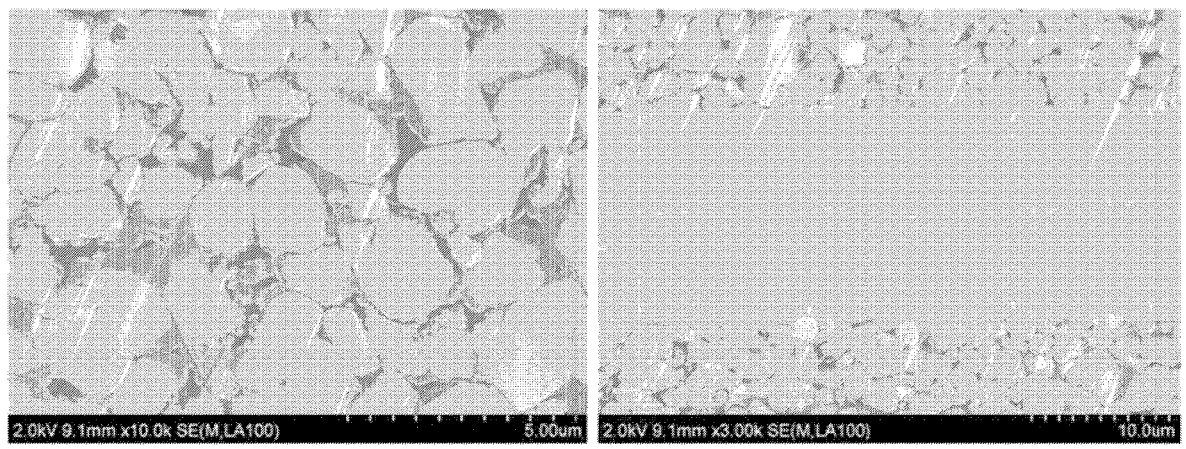
FIG. 13 is a SEM image of the cross-section of a positive electrode plate manufactured in Embodiment 1.

In order to check the degree of particle breakage of the positive electrode active material after rolling the positive electrode plates manufactured in Embodiment 1 and Comparative Example 1, the positive electrode plates were cut by an ion milling apparatus, and then images of the cross-sections thereof were captured by SEM. FIG. 13 illustrates a SEM image of the cross-section of the positive electrode plate manufactured in Embodiment 1, and FIG. 14 illustrates a SEM image of the cross-section of the positive electrode plate manufactured in Comparative Example 1.

Figure 14:
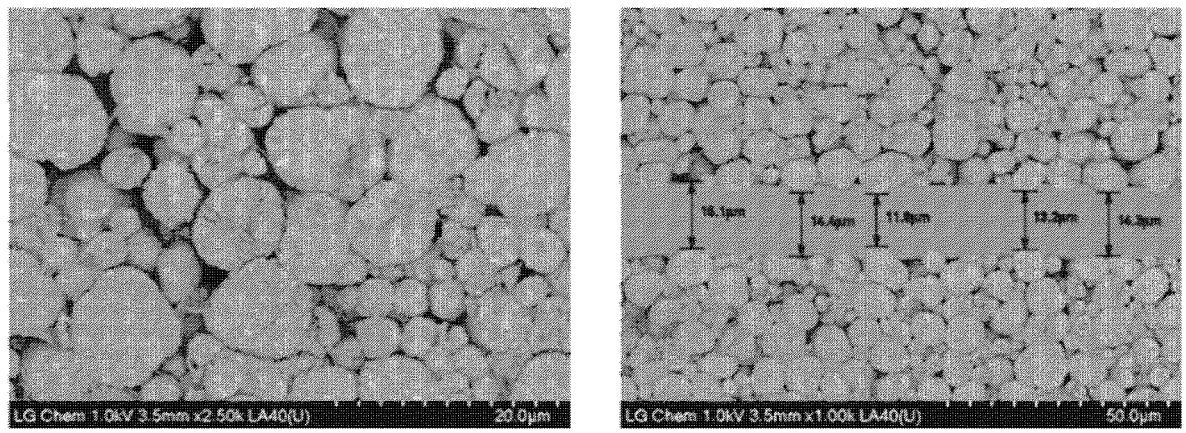
FIG. 14 is a SEM image of the cross-section of a positive electrode plate manufactured in Comparative Example 1.

Through FIGS. 13 and 14, it was observed that there was almost no particle breakage of the positive electrode active material even after rolling in the positive electrode plate of Embodiment 1, but there were several particle breakages of the positive electrode active material after rolling in the positive electrode plate of Comparative Example 2 in which secondary particles are used.

DESCRIPTION OF THE SYMBOLS

10: Positive electrode plate
11: Negative electrode plate
12: Separator
20: Current collector 21, 21a: Active material layer
22, 22a, 22c, 146b: Uncoated portion
24: Insulating layer
140, 170: Cylindrical battery
141: Electrode assembly
142, 171: Battery can
143, 178: Sealing body
144: First current collecting plate
145, 176: Second current collecting plate
146: Insulator
152: Venting portion
172: Rivet terminal
173: Second gasket
147: Beading portion
148: Crimping portion
149: Lead

The invention claimed is:

1. A lithium secondary battery comprising:
an electrode assembly in which a positive electrode plate, a negative electrode plate, and a separator interposed between the positive electrode plate and the negative electrode plate are wound in one direction;
a battery can in which the electrode assembly is accommodated; and
a sealing body which seals an open end of the battery can, wherein the positive electrode plate comprises positive electrode active material which comprises single particles, quasi-single particles, or a combination thereof,
the positive electrode active material has $D_{min}$ of 1.0 μm or more,
the positive electrode active material has $D_{max}$ of 12 μm to 17 μm,
the lithium secondary battery is cylindrical battery having a ratio of form factor of 0.4 or more, wherein the ratio of form factor is a value obtained by dividing a diameter of the cylindrical battery by a height of the cylindrical battery, and
the positive electrode active material comprises a lithium nickel-based oxide that comprises 80 mol % or more of Ni on a basis of a total number of moles of transition metal in the lithium nickel-based oxide.

2. The lithium secondary battery of claim 1, wherein the positive electrode active material has $D_{50}$ of 5 μm or less.

3. The lithium secondary battery of claim 1, wherein a particle size distribution (PSD) of the positive electrode active material is represented by Equation 1 below and has a value of 3 or less:

Particle size distribution(PSD)=$(D_{max}-D_{min})/D_{50}$ [Equation 1].

4. The lithium secondary battery of claim 1, wherein the positive electrode active material has a unimodal particle size distribution that exhibits a single peak in a volume accumulated particle size distribution graph.

5. The lithium secondary battery of claim 1, wherein single particles, quasi-single particles, or the combination thereof is present in an amount of 95 wt % to 100 wt % on a basis of a total weight of the positive electrode active material present in the positive electrode plate.

6. The lithium secondary battery of claim 1, wherein the lithium nickel-based oxide is represented by Chemical Formula 1 below:

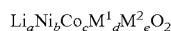
[Chemical Formula 1]

where, in Chemical Formula 1, $M^1$ is Mn, Al, or a combination thereof, $M^2$ is Zr, W, Y, Ti, Mg, Ca, Sr, Ta, Nb, and Ba, $0.8 \leq a \leq 1.2$, $0.83 \leq b < 1$, $0 < c < 0.17$, $0 < d < 0.17$, and $0 \leq e \leq 0.1$.

7. The lithium secondary battery of claim 1, wherein the positive electrode active material has a primary particle diameter of 0.5 μm to 5 μm.

8. The lithium secondary battery of claim 1, wherein the negative electrode plate comprises a silicon-containing negative electrode active material.

9. The lithium secondary battery of claim 1, wherein the negative electrode plate comprises a silicon-based negative electrode active material and a carbon-based negative electrode active material.

10. The lithium secondary battery of claim 9, wherein the silicon-based negative electrode active material and the carbon-based negative electrode active material are present in a weight ratio of 1:99 to 20:80.

11. The lithium secondary battery of claim 1, wherein the cylindrical battery is a 46110 cell, a 4875 cell, a 48110 cell, a 4880 cell, or a 4680 cell.

12. The lithium secondary battery of claim 1, wherein each of the positive electrode plate and the negative electrode plate comprises an uncoated portion in which an active material layer is not formed,
wherein at least a portion of the uncoated portion of the positive electrode plate or the negative electrode plate defines an electrode tab.

13. The lithium secondary battery of claim 12, wherein the positive electrode plate-uncoated portion and the negative electrode plate-uncoated portion are formed at an end of one side of the positive electrode plate and an end of one side of the negative electrode plate, respectively, along a direction in which the electrode assembly is wound,
wherein a current collecting plate is coupled to each of the positive electrode plate-uncoated portion and the negative electrode plate-uncoated portion, and
the current collecting plate is connected to an electrode terminal.

14. The lithium secondary battery of claim 13, wherein each of the positive electrode plate-uncoated portion and the negative electrode plate-uncoated portion is processed in a form of a plurality of segments that are independently bendable, and
at least a portion of the plurality of segments are bent toward a winding center of the electrode assembly.

15. The lithium secondary battery of claim 14, wherein at least a portion of the plurality of bent segments are overlapped on an upper end and a lower end of the electrode assembly, and
the current collecting plate is coupled to the plurality of overlapped segments.

16. The lithium secondary battery of claim 12, wherein on the positive electrode plate, an insulating layer is further provided, which covers a portion of the positive electrode active material layer and a portion of the uncoated portion along a direction parallel to the winding direction.

17. A battery pack comprising the lithium secondary battery of claim 1.

18. An automobile comprising the battery pack of claim 17.

* * * * *